United States Patent
Razzak et al.

(10) Patent No.: US 12,454,673 B1
(45) Date of Patent: Oct. 28, 2025

(54) METHOD OF CULTIVATING ALGAL BIOMASS USING OILFIELD HYPERSALINE BRINE

(71) Applicant: King Fahd University of Petroleum and Minerals, Dhahran (SA)

(72) Inventors: Shaikh Abdur Razzak, Dhahran (SA); Mohammed Omar Faruque, Dhahran (SA); Mohammad Mozahar Hossain, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/246,983

(22) Filed: Jun. 24, 2025

(51) Int. Cl.
*C12N 1/12* (2006.01)
*C12R 1/89* (2006.01)

(52) U.S. Cl.
CPC ............ *C12N 1/12* (2013.01); *C12R 2001/89* (2021.05)

(58) Field of Classification Search
CPC ...................................................... C12N 1/12
See application file for complete search history.

(56) References Cited

U.S. PATENT DOCUMENTS

2016/0039693 A1    2/2016   Kuehnle et al.

FOREIGN PATENT DOCUMENTS

| IN | 201931000192 A | 2/2019 |
|---|---|---|
| WO | 2009/149260 A1 | 12/2001 |

OTHER PUBLICATIONS

Rahmani et al., "Oilfield produced water as a medium for the growth of Chlorella pyrenoidosa outdoor in an arid region," Environmental science and pollution research 29:87509-87518, 2022.*

Mohammed Omar Faruque, et al., "Bioremediation of dissolved organic compounds in produced water from oil and gas operations using Chlorella sorokiniana: a sustainable approach", Environmental Monitoring and Assessment, vol. 197, Article 72, Dec. 19, 2024, 23 pages.

Ashiqur Rahman, et al. "Evaluation of Galdieria sulphuraria and Chlorella vulgaris for the Bioremediation of Produced Water", Water 2021, vol. 13, Issue 9, 1183, Apr. 25, 2021, 10 pages.

* cited by examiner

*Primary Examiner* — Rosanne Kosson
(74) *Attorney, Agent, or Firm* — Oblon, McClelland, Maier &Neustadt, L.L.P.

(57) ABSTRACT

A method of cultivating algal biomass using oilfield hypersaline brine (HSB) including: admixing oilfield HSB with a first aqueous composition including source(s) of nitrogen and phosphorous to form an aqueous medium having a total salinity of from 0.1 to 40 g/L; inoculating the aqueous medium with an algal culture including *Chlorella sorokiniana* UTEX 1230 to form an aqueous growth medium; and, after a first duration, collecting algal biomass from the growth medium. The inoculant algal culture is obtained by subjecting *Chlorella sorokiniana* UTEX 1230 to n media having serially increased salinity in the range from 0.1 to 40 g/L, where n is from 5 to 10. The first medium of the series has a salinity of from 0.1 to 10 g/L and the $n^{th}$ medium of the series has a salinity of from 30 to 40 g/L. The *Chlorella sorokiniana* UTEX 1230 is isolated from each medium of the series.

20 Claims, 6 Drawing Sheets

METHOD OF CULTIVATING ALGAL BIOMASS USING OILFIELD HYPERSALINE BRINE

STATEMENT OF PRIOR DISCLOSURE BY INVENTOR

Aspects of the present disclosure are described in Faruque et al. "A green approach to adaptive cultivation of Chlorella sorokiniana in oilfield hypersaline wastewater for sustainable biomass production, nutrient removal, and bioenergy potential", Green Technologies and Sustainability, Volume 3, Issue 3, 100179, incorporated herein by reference in its entirety.

STATEMENT OF ACKNOWLEDGEMENT

Support provided by King Fahd University of Petroleum and Minerals (KFUPM) under Grant No. NRC 2404 is gratefully acknowledged.

BACKGROUND

Technical Field

The present disclosure is directed to a method of cultivating algal biomass using oil field hypersaline brine (HSB).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As the urgency for sustainable energy sources grows-amid climate change and fossil fuel depletion (See: Holechek, J. L., Geli, H. M. E., Sawalhah, M. N., Valdez, R., A Global Assessment: Can Renewable Energy Replace Fossil Fuels by 2050? Sustain. 2022, 14, 1-22)—microalgae, such as Chlorella sorokiniana, have emerged as a viable alternative due to their capacity to sequester carbon dioxide and efficiently produce biofuels (See: Xie, Y., Khoo, K. S., Chew, K. W., Devadas, V. V., Phang, S. J., Lim, H. R., Rajendran, S., Show, P. L., Advancement of renewable energy technologies via artificial and microalgae photosynthesis. Bioresour. Technol. 2022, 363, 127830). Microalgae may offer a sustainable solution for biomass production as they are recognized for their ability to accumulate valuable macromolecules in diverse environmental conditions. However, achieving optimal microalgal growth typically requires nutrient-rich environments, which often depend on expensive synthetic fertilizers that can harm the environment (See: Nur, M. M. A., Buma, A. G. J., Opportunities and Challenges of Microalgal Cultivation on Wastewater, with Special Focus on Palm Oil Mill Effluent and the Production of High Value Compounds. Waste and Biomass Valorization 2019, 10, 2079-2097.).

In this context, the utilization of unconventional nutrient sources for microalgae growth presents an attractive solution, offering both economic and environmental benefits (See: Kumar, Y., Kaur, S., Kheto, A., Munshi, M., Sarkar, A., Om Pandey, H., Tarafdar, A., Sindhu, R., Sirohi, R., Cultivation of microalgae on food waste: Recent advances and way forward. Bioresour. Technol. 2022, 363, 127834.).

Spent brine (SB) has been recognized as an underutilized resource that could serve as a growth medium for microalgae but the use of brine may be inhibited by the high salinity thereof or the a deficient nutrient content thereof (See: Sullivan Graham, E. J., Dean, C. A., Yoshida, T. M., Twary, S. N., Teshima, M., Alvarez, M. A., Zidenga, T., Heikoop, J. M., Perkins, G. B., Rahn, T. A., Wagner, G. L., Laur, P. M., Oil and gas produced water as a growth medium for microalgae cultivation: A review and feasibility analysis. Algal Res. 2017, 24, 492-504.). In particular, oilfield hypersaline brine (HSB), a byproduct of oil extraction, presents significant environmental challenges due to its high salinity. Moreover, nitrogen and phosphorus deficiencies in HSB could limit microalgal growth therein. That aside, municipal wastewater contains nutrients that can support microalgal growth. Thus combining oilfield HSB with municipal wastewater presents a promising approach for enhancing biomass production and tackling environmental challenges.

Freshwater microalgae such as C. sorokiniana face challenges in high salinity environments due to ionic imbalances and osmotic stress, the microalgae typically struggling to survive beyond a certain salinity threshold (See: Shetty, P., Gitau, M. M., Maróti, G., Salinity stress responses and adaptation mechanisms in eukaryotic green microalgae. Cells 2019, 8, 1-16.). To mitigate this issue, stepwise saline adaptation—also known as gradual acclimation—has been proposed as an effective cultivation strategy. This method involves incrementally exposing microalgae to higher salinity levels through successive culture passages, which facilitates acclimatization and enhances their tolerance (See: Parsy, A., Sambusiti, C., Baldoni-andrey, P., Elan, T., Périé, F., Cultivation of Nannochloropsis oculata in saline oil & gas wastewater supplemented with anaerobic digestion effluent as nutrient source. Algal Res. 2020, 50, 101966.). By simulating the natural adaptation processes observed in microalgal populations in saline habitats, this approach allows for the selection of salt-tolerant strains that exhibit improved growth and biochemical productivity (See: Ishika, T., Moheimani, N. R., Laird, D. W., Bahri, P. A., 2019. Stepwise culture approach optimizes the biomass productivity of microalgae cultivated using an incremental salinity increase strategy. Biomass and Bioenergy 2019, 127, 105274.). While extensive research has explored C. sorokiniana in diverse media, its adaptability to hypersaline brine (HSB) remains largely unexamined. Therefore, utilizing HSB enriched with municipal wastewater as a nutrient source offers a promising cultivation strategy that addresses brine disposal challenges while capitalizing on the biomass production capabilities of this microalga under adverse conditions.

Accordingly, it is one object of the present disclosure to provide a method for progressive adaptation of C. sorokiniana in synthetic oilfield HSB supplemented with tertiary synthetic municipal wastewater (SMW) and to investigate the growth kinetics, bioenergy potential, and overall performance of C. sorokiniana under extreme conditions. This approach enables assessment of C. sorokiniana's resilience, nutrient uptake, biomass productivity, and applicability in bioenergy, wastewater treatment, and bioremediation.

SUMMARY

In an exemplary embodiment, a method of cultivating algal biomass using oilfield hypersaline brine (HSB) is described. The method comprises: admixing the oilfield HSB with a first aqueous composition including a source of nitrogen and a source of phosphorous to form an aqueous medium having a total salinity of from about 0.1 to about 40 grams per liter (g/L); and, inoculating the aqueous medium with an algal culture including *Chlorella sorokiniana* UTEX 1230 to form an aqueous growth medium and, after a first duration, collecting algal biomass from the aqueous growth medium. The *Chlorella sorokiniana* UTEX 1230 of the algal culture is obtained by subjecting *Chlorella sorokiniana* UTEX 1230 to n media having serially increased salinity in the range from about 0.1 to about 40 g/L, wherein: n is from 5 to 10; the first medium of the series has a salinity of from about 0.1 to about 10 g/L; the $n^{th}$ medium of the series has a salinity of from about 30 to about 40 g/L; and, the *Chlorella sorokiniana* UTEX 1230 is isolated from each medium of the series.

In some embodiments, the aqueous growth medium has a pH of from about 5 to about 7.

In some embodiments, the aqueous growth medium has a total dissolved solids (TDS) content of from about 0.5 to about 30 g/L.

In some embodiments, the aqueous growth medium has a total nitrogen (TN) content of from about 10 to about 50 milligrams per liter (mg/L).

In some embodiments, the aqueous growth medium has a total phosphorous (TP) content of from about 20 to about 60 mg/L.

In some embodiments, the admixed first aqueous composition includes municipal wastewater, and, the aqueous medium has a total salinity of from about 0.1 to about 30 g/L.

In some embodiments, the aqueous medium is inoculated with the algal culture in an amount to form an aqueous growth medium having an initial optical density of from about 0.3 to about 0.5, as determined using light having a wavelength of about 680 nanometers (nm).

In some embodiments, the aqueous medium is inoculated with the algal culture in an amount to form an aqueous growth medium having an initial optical density of from about 0.35 to about 0.45, as determined using light having a wavelength of about 680 nm.

In some embodiments, the first duration is from about 5 to about 25 days.

In some embodiments, the collected algal biomass has, based on the dry weight of the biomass, a lipid content of from about 10 to about 35 weight percent (wt. %).

In some embodiments, the collected algal biomass has, based on the dry weight of the biomass, a carbohydrate content of from about 20 to about 65 wt. %.

In some embodiments, the collected algal biomass has, based on the dry weight of the biomass, a protein content of from about 10 to about 30 wt. %.

In some embodiments, n is from 6 to 8.

In some embodiments, the first medium of the series has a salinity of from about 0.1 to about 1 g/L.

In some embodiments, wherein the $n^{th}$ medium of the series has a salinity of from about 32 to about 36 g/L.

In some embodiments, each of the n media of the series is obtained by admixing oilfield HSB with a second aqueous composition including a source of nitrogen and a source of phosphorous.

In some embodiments, the second aqueous composition includes synthetic municipal wastewater.

In some embodiments, the second aqueous composition comprises: from about 200 to about 500 milligrams per liter (mg/L) of sodium nitrate ($NaNO_3$); from about 50 to about 200 mg/L of dipotassium phosphate ($K_2HPO_4$); and, from about 100 to about 250 mg/L of $KH_2PO_4$.

In some embodiments, the duration of subjection of the *Chlorella sorokiniana* UTEX 1230 to each of the n media of the series is independently selected from about 5 to about 25 days.

In some embodiments, the duration of subjection of the *Chlorella sorokiniana* UTEX 1230 to each of the n media is independently from about 10 to about 25 days.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
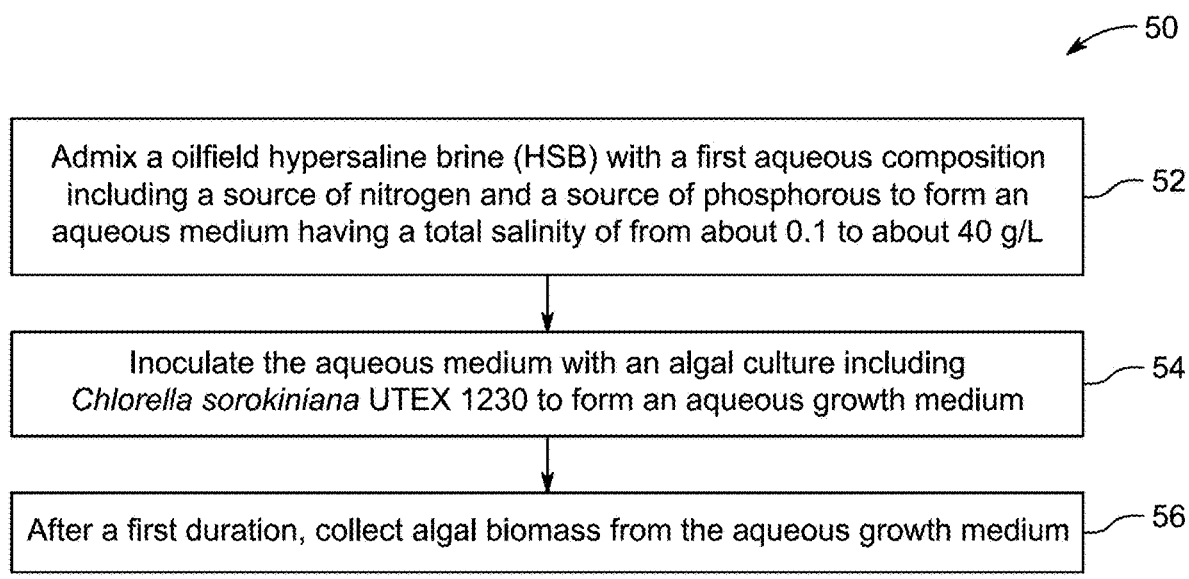
FIG. 1A illustrates a flow chart of an exemplary method of cultivating algal biomass including *Chlorella sorokiniana* UTEX 1230 using oilfield hypersaline brine (HSB), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views.

Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the proportion, or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

As used herein, the term 'content' refers to the amount of a particular substance, component, or element within the sample. It can be a quantitative or qualitative measure of a biological constituent within an organism or environment. It can be expressed in terms of mass or concentration (expressed in units such as grams, milligrams (mg), micrograms (µg); in percentage (%); in relative units (such as fold changes or arbitrary units); molecular counts (such as copies per cell or molecules per cell); or, energy content (expressed in units such as calories (cal), kilocalories (kcal), joules (J)).

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'source' refers to any organ, tissue, or area that produces or supplies substances, such as nutrients, energy or signals, to other parts of an organism or system.

As used herein, the term 'composition' refers to the makeup or arrangement of different components within a biological substance, organism, or system. It can be a chemical composition (such as lipids, proteins and carbohydrates), tissue composition (including proportion of different cell types or tissues in an organ or organism), nutritional composition (including the content of nutrients in food or biomass), and microbial composition (including variety of abundance of microbial species in a sample or environment).

As referenced herein, *Chlorella sorokiniana* UTEX 1230 is an algal strain of class Chlorophyceae which is available from University of Texas Culture Collection of Algae, 205 W.24th Street, Stop A6700, Austin, TX 78712-1240, United States of America. The Internal Transcribed Spacer (ITS) DNA sequence of this algal strain was submitted to the National Centre of Biotechnology Information on 21 Mar. 2022 and is available as GenBank 0N044222 *Chlorella sorokiniana* strain UTEX 1230 internal transcribed spacer 1,—Nucleotide—NCBI, the disclosure of which is incorporated herein by reference in its entirety. *Chlorella sorokiniana* UTEX 1230 demonstrates photo-autotrophic growth, wherein via photosynthesis sunlight, $CO_2$ and nutrients—such as nitrogen and phosphorous—are converted into biomass.

As used herein, the term 'biomass' refers to the total mass of living organisms in a given area, volume, or ecosystem at a particular time. It can be an ecological biomass, agricultural biomass (including crops, residues, or livestock used for food, feed, or fuel) or microbial biomass (including fermentation broth). It is generally expressed as fresh weight (including water) or dry weight (excluding water).

As used herein, the term 'algal biomass' refers to the total biomass (microscopic or macroscopic) in a given area or volume. It includes cellular components of algae such as proteins, carbohydrates, pigments, and other biomolecules, either in dry or wet form. It is typically expressed in grams per liter (g/L) for cultures or tons per hectare for large-scale cultivation. It is explored for fuel production, nutritional supplement, wastewater treatment and/or carbon capture. Algal biomass is a sustainable resource with applications in energy, food, pharmaceuticals, and environmental management.

As used herein, the term 'dry weight of biomass' refers to the mass of biological material after all water has been removed. It represents solid matter in organisms or organic samples (like plants, microbes or tissues). It is measured after drying the sample at a specific temperature until it reaches a constant weight. It is generally expressed in grams or milligrams. It is used in ecology, agriculture, microbiology and biotechnology to assess growth, productivity, or nutrient content.

The growth of *C. sorokiniana* UTEX 1230 in a medium requires a consistent source of carbon dioxide ($CO_2$). The algae may obtain such carbon dioxide via mass transfer at a gas-medium interface. Alternatively or additionally, a gas source containing carbon dioxide may be introduced into a given medium via aeration. The use of aeration is not precluded in the present disclosure: for instance, the passage of microbubbles of carbon dioxide though a given media may achieve effective mass transfer and thereby serve to achieve, maintain or stabilize the $CO_2$ level of a medium. It has been found in the present disclosure, however, that photo-autotrophic growth of *C. sorokiniana* UTEX 1230 has occurred without aeration of the media.

As used herein, the term 'salinity' is the measure of concentration of dissolved salts in water or soil. It indicates the amount of salt present in a given amount of liquid or material. The term 'salinity' is often used to describe the salt content of oceans, seas, or other bodies of water or the amount of soluble salt in the soil water. It can be expressed in units such as parts per thousand (ppt), practical salinity units (PSU), decisiemens per meter (dS/m).

As used herein, the term 'wastewater' refers to any water sample that has been used and contaminated by human, industrial, agricultural, or commercial activities, making it unsuitable for immediate reuse without treatment. It may contain contaminants derived from organic matter (such as food waste, human waste), chemicals (such as detergents, solvents, heavy metals), pathogens (bacteria, viruses), or nutrients (such as nitrogen, phosphorus and so on) or a combination thereof.

As used herein, the term 'municipal wastewater' refers to the wastewater generated from residential, commercial, and public facilities within a city or a town. It is also known as sewage and is collected through a sewer system for treatment.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$, isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Where the aspects of the disclosure are described above as having certain embodiments, any one or more of those embodiments can be implemented in or combined with any one of the further embodiments, even if that combination is not explicitly described. Expressed differently, the described embodiments are not mutually exclusive, and permutations thereof remain within the scope of this disclosure.

Aspects of this disclosure are directed to a method of cultivating algal biomass consisting of *Chlorella sorokiniana* UTEX 1230 using oilfield hypersaline brine (HSB). Through progressive adaptation in different HSB loadings, *C. sorokiniana* UTEX 1230 exhibited a better growth pattern and showed maximum biomass productivity in distinct HSB loadings.

FIG. 1A illustrates a flow chart of a method 50 of cultivating algal biomass using oilfield HSB. The method 50 involves the progressive adaptation and characterization of *Chlorella sorokiniana* UTEX 1230, a freshwater microalgal species, in the harsh conditions of oilfield HSB, underscoring the potential of *C. sorokiniana* as a bioenergy source and its suitability for utilization in petroleum-derived HSB. The order in which the method 50 is described is not intended to be construed as a limitation, and any number of the described method steps can be combined in any order to implement the method 50. Additionally, individual steps may be removed or skipped from the method 50 without departing from the scope of the present disclosure.

At step 52, the method 50 includes admixing the oilfield HSB with a first aqueous composition including a source of nitrogen and a source of phosphorous to form an aqueous medium having a total salinity of from about 0.1 to about 40 g/L. The aqueous medium may have a total salinity of from about 1 to about 39 g/L, for example from about 2 to about 38 g/L, from about 3 to about 37 g/L, from about 4 to about 36 g/L, from about 5 to about 35 g/L, from about 6 to about 34 g/L, from about 7 to about 33 g/L, from about 8 to about 32 g/L, from about 9 to about 31 g/L, from about 10 to about 30 g/L, from about 11 to about 29 g/L, from about 12 to about 28 g/L, from about 13 to about 27 g/L, from about 14 to about 26 g/L, from about 15 to about 25 g/L, from about 16 to about 24 g/L, from about 17 to about 23 g/L, from about 18 to about 22 g/L, and from about 19 to about 21 g/L.

In some embodiments, HSB comprises sodium chloride (NaCl) in an amount of from about 10 to about 25 g/L, for example from about 11 to about 24 g/L, from about 12 to about 23 g/L, from about 13 to about 22 g/L, from about 14 to about 21 g/L, from about 15 to about 20 g/L, and from about 16 to about 19 g/L.

In some embodiments, HSB comprises calcium chloride $(CaCl_2) \cdot 2H_2O$ in an amount of from about 20 to about 35 g/L, for example from about 21 to about 34 g/L, from about 22 to about 33 g/L, from about 23 to about 32 g/L, from about 24 to about 31 g/L, from about 25 to about 30 g/L, and from about 26 to about 29 g/L.

In some embodiments, HSB is composed of magnesium chloride $(MgCl_2 \cdot 6H_2O)$ in an amount of from about 1 to about 10 g/L, from about 2 to about 9 g/L, from about 3 to about 8 g/L, or from about 4 to about 7 g/L.

In some embodiments, HSB comprises potassium chloride (KCl) in an amount of from about 0.1 to about 1 g/L, for example from about 0.2 to about 0.9 g/L, from about 0.3 to 0.8 g/L, or from about 0.4 to about 0.7 g/L.

In some embodiments, HSB comprises sodium sulfate $(Na_2SO_4)$ in an amount of from 0.1 to about 5 g/L, for example from about 0.3 to about 4.8 g/L, from about 0.5 to about 4.6 g/L, from about 0.7 to about 4.4 g/L, from about 0.9 to about 4.2 g/L, or from about 1.1 to about 4.0 g/L.

In some embodiments, HSB comprises strontium chloride $(SrCl_2 \cdot 6H_2O)$ in an amount of from about 0.1 to about 1 g/L, for example from about 0.2 to about 0.9 g/L, or from about 0.3 to about 0.8 g/L.

In an exemplary embodiment, the HSB comprises: from about 15 to about 25 g/L NaCl; from about 20 to about 35 g/L $CaCl_2 \cdot 2H_2O$; from about 1 to about 10 g/L $MgCl_2 \cdot 6H_2O$; from about 0.1 to about 2 g/L KCl; from about 1 to about 2 g/L $Na_2SO_4$; and, from about 0.1 to about 2 g/L $SrCl_2 \cdot 6H_2O$. In a further exemplary embodiment, the HSB comprises: 16.75 g/L NaCl; 28.39 g/L $CaCl_2 \cdot 2H_2O$; 4.18 g/L $MgCl_2 \cdot 6H_2O$; 0.45 g/L KCl; 1.14 g/L $Na_2SO_4$; and, 0.34 g/L $SrCl_2 \cdot 6H_2O$.

In some embodiments, the admixed first aqueous composition may include domestic wastewater, industrial wastewater, agricultural wastewater, stormwater, leachate or a combination of one or more of these water sources. In a preferred embodiment, the admixed first aqueous composition includes municipal wastewater.

In some embodiments, the aqueous growth medium has a total dissolved solids (TDS) content of from about 0.5 to about 30 g/L, for example from about 1.5 to about 29 g/L, from about 2.5 to about 28 g/L, from about 3.5 to about 27 g/L, from about 4.5 to about 26 g/L, from about 5.5 to about 25 g/L, from about 6.5 to about 24 g/L, from about 7.5 to about 23 g/L, from about 8.5 to about 22 g/L, from about 9.5 to about 21 g/L, from about 10.5 to about 20 g/L, from about 11.5 to about 19 g/L, from about 12.5 to about 18 g/L, from about 13.5 to about 17 g/L, and or from about 14.5 to about 16 g/L. In a preferred embodiment, the aqueous growth medium has a total dissolved solids content of 0.553 g/L, 5.75 g/L, 10.39 g/L, 14.81 g/L, 18.98 g/L, 23.32 g/L, 27.59 g/L at 0%, 10%, 20%, 30%, 40%, 50% and 60% HSB loadings, respectively.

In some embodiments, the aqueous growth medium has a total nitrogen (TN) content of from about 10 to about 50 mg/L, for example from about 11 to about 49 mg/L, from about 12 to about 48 mg/L, or about 13 to about 49 mg/L. In an exemplary embodiment, the aqueous growth medium has a TN content of 41.18 mg/L. In an exemplary embodiment, the aqueous growth medium has a TN content of 35.33 mg/L. In an exemplary embodiment, the aqueous growth medium has a TN content of 27.6 mg/L. In an exemplary embodiment, the aqueous growth medium has a TN content of 25.0 mg/L. In an exemplary embodiment, the aqueous growth medium has a TN content of 20.0 mg/L. In an exemplary embodiment, the aqueous growth medium has a TN content of 18.0 mg/L. In an exemplary embodiment, the aqueous growth medium has a TN content of 14.0 mg/L.

In some embodiments, the aqueous growth medium has a total phosphorous (TP) content of from about 20 to about 60 mg/L, for example from about 20.5 to about 59.5 mg/L, from about 21.0 to about 59.0 mg/L, from about 21.5 to about 58.5 mg/L, or from about 22.0 to about 58.0 mg/L. In an exemplary embodiment, the aqueous growth medium has a TP content of 41.18 mg/L. In an exemplary embodiment, the aqueous growth medium has a TP content of 35.33 mg/L. In an exemplary embodiment, the aqueous growth medium has a TP content of 27.6 mg/L. In an exemplary embodiment, the aqueous growth medium has a TP content of 25.0 mg/L. In an exemplary, the aqueous growth medium has a TP content of 20.0 mg/L. In an exemplary embodiment, the aqueous growth medium has a TP content of 18.0 mg/L. In an exemplary embodiment, the aqueous growth medium has a TP content of 14.0 mg/L.

At step 54, the method 50 includes inoculating the aqueous medium with an algal culture including *Chlorella sorokiniana* UTEX 1230 to form an aqueous growth medium.

In some embodiments, the algal culture may further include at least one additional photo synthetic microorganism of which examples include *Nannochloropsis oculata*, *Nannochloropsis* sp., *Nannochloropsis salina*, *Nannochloropsis gaditana*, *Tetraselmis suecica*, *Tetraselmis chuii*, *Chlorella* sp., *Chlorella salina*, *Chlorella prothothecoides*, *Chlorella ellipsoidea*, *Chlorella emersonii*, *Chlorella minutissima*, *Chlorella pyrenoidosa*, alternative *Chlorella sorokiniana* algal strains, *Chlorella vulgaris*, *Chroomonas slaina*, *Cyclotella cryptic*, *Cyclotella* sp., *Dunaliella tertiolecta*, *Dunaliella salina*, *Dunaliella bardawil*, *Botryococcus braunii*, *Euglena gracilis*, *Gymnodimium nelsoni*, *Haematococcus pluvialis*, *Isochrysis galbana*, *Monoraphidium mimitium*, *Monoraphidium* sp., *Nannochloris*, *Neochloris oleoabundans*, *Nitzschia laevis*, *Onoraphidium* sp., *Pavlova lutheri*, *Phaeodactylum tricormitum*, *Porphyridium cruentum*, *Scenedesmus obliquus*, *Scenedesmus quadricaula*, *Scenedesmus* sp., *Stichococcus bacillaris*, *Stichococcus minor*, *Spirulina platensis*, *Thalassiosira* sp., *Chlamydomonas reinhardtii*, *Chlamydomonas* sp., *Chlamydomonas acidophila*, *Isochrysis* sp., *Phaeocystis*, *Aureococcus*, *Prochlorococcus*, *Synechococcus*, *Synechococcus elongatus*, *Synechococcus* sp., *Anacystis nidulans*, *Anacystis* sp., *Picochlorum oklahomensis*, *Picocystis* sp. or a combination thereof. In an exemplary embodiment, the inoculating algae culture consists essentially or consists of *Chlorella sorokiniana* UTEX 1230.

In some embodiments, the aqueous medium is inoculated with the algal culture in an amount to form an aqueous growth medium having an initial optical density of from about 0.3 to about 0.5, for example from about 0.32 to about 0.48, from about 0.34 to about 0.46, or from about 0.36 to about 0.44, as determined using light having a wavelength of about 680 nm.

In some embodiments, the aqueous medium is inoculated with the algal culture in an amount to form an aqueous growth medium having an initial optical density of from about 0.35 to about 0.45. The aqueous medium may, for example, be inoculated with the algal culture in an amount to form an aqueous growth medium having an initial optical density of from about 0.355 to about 0.445, from about 0.360 to about 0.440, from about 0.365 to about 0.435 or from about 0.370 to 0.430, as determined using light having a wavelength of about 680 nm. In a preferred embodiment, the aqueous medium is inoculated with the algal culture in an amount to form an aqueous growth medium having an initial optical density of from about 0.375 to about 0.4.

At step 56, the method 50 includes, after a first duration, collecting algal biomass from the aqueous growth medium. The method of collection of the algal biomass is not intended to be limited but may, for example, include flocculation, centrifugation and separation using microscreens. It is noted that interrupting the carbon dioxide supply can cause algae to auto-flocculate; in the alternative or additionally flocculation may be effected by introducing a chemical flocculant into the medium. Froth flotation, wherein the cultivator aerates the medium into a froth and then skims the algal biomass from the top thereof—may have utility in the present disclosure.

In some embodiments, the first duration is from about 5 to about 25 days, for example from about 6 to about 24 days, from about 7 to about 23 days, from about 8 to about 22 days, from about 9 to about 21 days, from about 10 to about 20 days, from about 11 to about 19 days, from about 12 to about 18 days, from about 13 to about 17 days, from about 14 to about 16 days, or about 15 days. In a preferred embodiment, there is a variation in cultivation period in different concentration of HSB medium. In a preferred embodiment, microalgae were cultured about 24 days for medium with lower HSB loadings (up to 30%), and for medium with higher HSB loadings (up to 60%), incubation lasted for about 14 days.

In some embodiments, there is a variation in the lag phase and exponential phase in different HSB loadings photobioreactors. In a preferred embodiment, lag phase is avoided in the culture of all photobioreactors except 40% and 50% HSB loadings photobioreactors. In a preferred embodiment, the exponential phase is initiated in 40% and 50% HSB loadings photobioreactors with increased HSB loadings after a single day of incubation. In a preferred embodiment, common end of exponential growth phase was observed on day 17 in the photobioreactors having the culture media of 0%, 10%, and 20% HSB loadings, photobioreactor with 30% HSB grew well until day 23, photobioreactors with 50% HSB and 60% HSB grew exponentially until day 7, and photobioreactors with 40% HSB loadings showed exponential growth for 9 days.

In some embodiments, microalgae *C. sorokiniana* shows varied growth pattern than that of control and medium with different HSB loadings. In some embodiments, microalgae *C. sorokiniana* shows better growth pattern at HSB loadings in the range of 10 to 30%, and preferably 15 to 25%. In some embodiments, microalgae *C. sorokiniana* shows a relatively decreased growth profile at HSB loadings equal to or greater than 40%, preferably equal to or greater than 45%, preferably equal to or greater than 50%, and preferably equal to or greater than 55%. In a preferred embodiment, microalgae *C.*

*sorokiniana* shows a relatively decreased growth profile for 40%, 50% and 60% HSB loadings.

In an alternative or additional definition of the first duration, the collection of the algal biomass may occur when the aqueous medium inoculated with the algal culture attains a particular optical density, as determined using light having a wavelength of about 680 nm. For example, the first duration may be elected based on the aqueous growth medium reaching a maximum optical density of from about 3 to about 6, for example about 3.2 to about 5.8, about 3.4 to about 5.4, about 3.6 to about 5.2, or about 3.8 to about 5.0, as determined using light having a wavelength of about 680 nm. In an exemplary embodiment, the first duration may be elected based on the aqueous growth medium reaching a maximum optical density of from about 4.0 to about 5.0.

It is not precluded that the aqueous growth medium be subjected to continuous illumination. However, more conventionally and the for the first duration, the aqueous growth medium may be maintained at a temperature of from 20 to about 40° C. and subjected to dark period-to-light period cycling. The aqueous growth medium may, for example, be maintained at a temperature of from about 21° C. to about 39° C., from about 22° C. to about 38° C., from about 23° C. to about 37° C., from about 24° C. to about 36° C., from about 25° C. to about 35° C., from about 26° C. to about 34° C., from about 27° C. to about 33° C., from about 28° C. to about 32° C., or from about 29° C. to about 31° C. In some embodiments, for the first duration, the aqueous growth medium is maintained at a temperature of from about 20 to about 30° C., from about 21° C. to about 29° C., from about 22° C. to about 28° C., from about 23° C. to about 27° C., or from about 24° C. to about 26° C. In the aforementioned dark period-to-light period cycling, each dark period is of x hours (h), each light period is of (24–x) h and x is from about 6 to about 12, preferably from about 7 to about 11, or more preferably from about 8 to about 10. In some embodiments, in the dark period-to-light period cycling, x is from about 6 to about 10, for example from about 7 to about 9, or about 8. In certain embodiments, such dark period to light period cycling may be effected by exposing the aqueous growth medium to diurnal sunlight.

In any period of illumination of the aqueous growth medium, the incident radiation may conventionally have an intensity of from about 1 to about 1000 mW/cm$^2$, for example from about 10 to 1000 mW/cm$^2$, from about 10 to about 500 mW/cm$^2$ or from about 50 to about 500 mW/cm$^2$. It is noted that the standard irradiance of sunlight is about 90 to about 110 mW/cm$^2$ and, as such, it is not precluded that sunlight may have utility in the present disclosure.

In some embodiments, microalgae can uptake nitrogen and phosphorus from wastewater as nutrients for their growth and metabolism. Microalgae are capable of absorbing a greater amount of nitrate when exposed to reduced levels of salt. Consequently, significant amounts of this nutrient may be depleted from the supplemented HSB medium due to the growth of microalgae by the end of the culture period.

Salinity influences the cellular metabolism of microalgae. High salinity levels can stress microalgae, alter their metabolic pathways and affect the accumulation of lipid, protein, and carbohydrate in microalgal biomass. Carbohydrate is a significant constituent of algal biomass, and its synthesis can be influenced by variations in growth conditions, such as the properties of the nutritional media, for instance the levels of nitrogen, phosphorous and other micronutrients. During nutrient limitation in the stationary phase, which is the phase characterized by growth conditions that are restricted, the majority of carbon is typically transformed into carbohydrate content.

In some embodiments, the collected algal biomass has, based on the dry weight of the biomass, a carbohydrate content of from about 20 to about 65 wt. %. The collected algal biomass may have, for example, a carbohydrate content of from about 20.5 to about 64.5 wt. %., from about 21.0 to about 64.0 wt. %, from about 21.5 to about 63.5 wt. %, or from about 22.0 to about 63.0 wt. %. In an exemplary embodiment, the collected algal biomass has, based on the dry weight of the biomass, a carbohydrate content of about 62.87 wt. %. In another exemplary embodiment, the collected algal biomass has, based on the dry weight of the biomass, a carbohydrate content of 35.46 wt. %. In another exemplary embodiment, the collected algal biomass has, based on the dry weight of the biomass, a carbohydrate content of 38.02 wt. %. In another exemplary embodiment, the collected algal biomass has, based on the dry weight of the biomass, a carbohydrate content of 43.87 wt. %. In another exemplary embodiment, the collected algal biomass has, based on the dry weight of the biomass, a carbohydrate content of 32.91 wt. %. In another exemplary embodiment, the collected algal biomass has, based on the dry weight of the biomass, a carbohydrate content of 37.41 wt. %. In yet another exemplary embodiment, the collected algal biomass has, based on the dry weight of the biomass, a carbohydrate content of 25 wt. %.

Protein in microalgae biomass is a valuable resource with diverse applications. Microalgae are rich sources of high-quality protein, encompassing essential amino acids vital for human and animal health. Salinity may cause microalgae to produce less total protein. Elevated levels of salt may, in particular, limit the activation of adenosine triphosphate (ATP)-synthase, thereby inhibiting the synthesis of proteins.

In some embodiments, the collected algal biomass has, based on the dry weight of the biomass, a protein content of from about 10 to about 30 wt. %. For example, the collected algal biomass may have a protein content, based on the dry weight of the biomass, of from about 10.5 to about 29.5 wt. %, from about 11.0 to about 29.0 wt. %, or from about 11.5 to about 28.5 wt. %. In an exemplary embodiment, the collected algal biomass has, based on the dry weight of the biomass, a protein content of 28.12 wt. %. In an exemplary embodiment, the collected algal biomass has, based on the dry weight of the biomass, a protein content of 19.81 wt. %. In another exemplary embodiment, the collected algal biomass has, based on the dry weight of the biomass, a protein content of 16.18 wt. %. In another exemplary embodiment, the collected algal biomass has, based on the dry weight of the biomass, a protein content of 15.37 wt. %. In another exemplary embodiment, the collected algal biomass has, based on the dry weight of the biomass, a protein content of 18.93 wt. %. In another exemplary embodiment, the collected algal biomass has, based on the dry weight of the biomass, a protein content of 16.06 wt. %. In yet another exemplary embodiment, the collected algal biomass has, based on the dry weight of the biomass, a protein content of 15.81 wt. %.

In some embodiments, the collected algal biomass has, based on the dry weight of the biomass, a lipid content of from about 10 to about 35 wt. %. The collected algal biomass has, based on the dry weight of the biomass, a lipid content of from about 10.5 to about 34.5 wt. %, from about 12.0 to about 34.0 wt. %, from about 12.5 to about 33.5 wt. %, from about 13.0 to about 33.0 wt. % or from about 13.5 to about 32.5 wt. %.

During rapid cell growth, biomass accumulation may not occur as efficiently in the unfavorable conditions as they would under optimal conditions. Moreover, in a saline environment, light penetration may be reduced due to factors such as increased scattering or absorption by dissolved salts. This can limit the amount of light available to the microalgae for photosynthesis, thereby reducing their overall biomass productivity despite a high specific growth rate.

The *Chlorella sorokiniana* UTEX 1230 of the inoculating algal culture of step 54 of the method 50 is obtained by subjecting an initially obtained *Chlorella sorokiniana* UTEX 1230 to a step-wise adaptation to saline conditions. More particularly, the initially obtained *Chlorella sorokiniana* UTEX 1230 is subjected to n media having serially increased salinity but wherein each medium has a salinity in the range from about 0.1 to about 40 grams per liter (g/L). Without intention to limit the present disclosure, the *Chlorella sorokiniana* UTEX 1230 subjected to the first media may be that algae directly obtained from the depository source.

The *Chlorella sorokiniana* UTEX 1230 is isolated from each medium of the series of n media and then introduced into the subsequent medium up to an including the n'h medium. The method of isolation of the algae is not intended to be limited but may, for example, include flocculation, centrifugation and separation using microscreens. It is noted that interrupting the carbon dioxide supply can cause algae to auto-flocculate; in the alternative or additionally flocculation may be effected by introducing a chemical flocculant into the medium. Froth flotation, wherein the cultivator aerates the medium into a froth and then skims the algae from the top thereof—may have utility in the present disclosure.

At least a fraction of the isolated *Chlorella sorokiniana* UTEX 1230 from a given medium of the series of n media in then used as an inoculant for the immediately subsequent medium in that series, said immediately subsequent medium being characterized by a higher salinity than that medium from which the alga was isolated. In certain embodiments, from about 5 to about 100 wt. %, for instance from 5 to about 75 wt. % or from about 5 to about 50 wt. % of the isolated *Chlorella sorokiniana* UTEX 1230 from a given medium is so used as an inoculant of that immediately subsequent medium. Alternatively, a fixed amount—either by weight or, more typically, by volume—of the isolated *Chlorella sorokiniana* UTEX 1230 may be so used as an inoculant.

The adaptation of the inoculating culture of *Chlorella sorokiniana* UTEX 1230 to saline conditions is effected by subjecting an initially obtained *Chlorella sorokiniana* UTEX 1230 culture to n media having serially increased salinity in the range from about 0.1 to about 40 g/L. The n media may, for example have serially increased salinity but wherein each medium has a salinity in the range of from about 0.2 to about 39.9 g/L, from about 0.3 to about 39.8 g/L or from about 0.4 to about 39.7 g/L. In an exemplary embodiment, the n media having serially increased salinity wherein each medium has a salinity in the range from about 0.42 g/L to about 34.46 g/L.

In some embodiments, n is from 5 to 10, for example from 6 to 9 or from 7 to 8. In some embodiments, n is from 6 to 8. In an exemplary embodiment, n is 7.

In some embodiments, the first medium of the series has a salinity of from about 0.1 to about 10 g/L, for example from about 0.5 to about 9.5 g/L, from about 1.0 to about 9.0 g/L, from about 1.5 to about 8.5 g/L, from about 2.0 to about 8.0 g/L, from about 2.5 to about 7.5 g/L, from about 3.0 to about 7.0 g/L, from about 3.5 to about 6.5 g/L, from about 4.0 to about 6.0 g/L, or from about 4.5 to about 5.5 g/L. In some embodiments, the first medium of the series has a salinity of from about 0.1 to about 1 g/L, from about 0.15 to about 0.95 g/L, from about 0.20 to about 0.90 g/L, from about 0.25 to about 0.85 g/L, from about 0.30 to about 0.80 g/L, from about 0.35 to 0.75 g/L, from about 0.40 to about 0.70 g/L, and from about 0.50 to about 0.60 g/L. In a preferred embodiment, the first medium of the series has a salinity of 0.42 g/L.

In some embodiments, the $n^{th}$ medium of the series has a salinity of from about 32 to about 36 g/L, for example from about 32.2 to about 35.8 g/L, from about 32.4 to about 35.6 g/L, from about 32.6 to about 35.4 g/L, from about 32.8 to about 35.2 g/L, from about 33.0 to about 35.0 g/L, from about 33.2 to about 34.8 g/L, or from about 33.4 to about 34.6 g/L. In a preferred embodiment, the $n^{th}$ medium of the series has a salinity of 34.46 g/L.

Subject to the attainment of the salinities of the first and $n^{th}$ media of the aforementioned series, the difference in salinity between a given medium and that which directly follows it in the series of n media is independently determined. In an exemplary embodiment, each of the $2^{nd}$ to $n^{th}$ media of the series of n media may have a salinity which is independently selected to be from about 0.5 to about 10 g/L greater than the medium which immediately precedes it. For instance, each of the $2^{nd}$ to $n^{th}$ media of the series of n media may have a salinity which is independently selected to be from about 1 to about 10 g/L, from about 2 to about 10 g/L or from about 2 to about 8 g/L greater than the medium which immediately precedes it.

In some embodiments, each of the n media of the series is obtained by admixing oilfield HSB with a second aqueous composition including a source of nitrogen and a source of phosphorous.

In some embodiments, the second aqueous composition includes synthetic municipal wastewater. In some embodiments, the second aqueous composition includes from about 200 to about 500 mg/L of sodium nitrate ($NaNO_3$), for example from about 210 to about 490 milligrams per liter (mg/L), from about 220 to about 480 mg/L, from about 230 to about 470 mg/L, or from about 240 to about 480 mg/L. In a preferred embodiment, the second aqueous composition includes about 250 mg/L of sodium nitrate ($NaNO_3$).

In some embodiments, the second aqueous composition includes from about 50 to about 200 mg/L of $K_2HPO_4$, for example from about 55 to about 195 mg/L, from about 60 to about 190 mg/L, from about 65 to about 185 mg/L, or from about 70 to about 180 mg/L. In a preferred embodiment, the second aqueous composition includes 75 mg/L of $K_2HPO_4$.

In some embodiments, the second aqueous composition includes from about 100 to about 250 mg/L of $KH_2PO_4$, for example from about 110 to about 240 mg/L, from about 120 to about 230 mg/L, from about 130 to about 220 mg/L, from about 140 to about 210 mg/L, from about 150 to about 200 mg/L, from about 160 to about 190 mg/L, or from about 170 to about 180 mg/L. In a preferred embodiment, the second aqueous composition comprises about 175 mg/L of $KH_2PO_4$.

In some embodiments, the microalgae are exposed to different nutrients and osmotic conditions. In some embodiments, the initial media consists of HSB and SMW in the ratio by weight of from about (1:10) to about (1:2). For example, the initial media may consist of HSB and SMW in the ratio by weight of from about (1:9) to about (6:4), from about (2:8) to about (5:5), or from about (3:7) to about (4:6). In a preferred embodiment, the initial media consists of a 10 wt. % HSB and 90 wt. % SMW mixture, with the HSB proportion serially increasing to a ratio by weight of 60 wt. % HSB and 40 wt. % SMW by the final phase.

In some embodiments, the duration of subjection of the *Chlorella sorokiniana* UTEX 1230 to each of the n media is independently from about 10 to about 25 days. The duration of subjection of the *Chlorella sorokiniana* UTEX 1230 to each of the n media may, for example, be from about 11 to about 24 days, from about 12 to about 23 days, from about 13 to about 22 days, from about 14 to about 21 days, from about 15 to about 20 days, from about 16 to about 19 days or from about 17 to about 18 days.

In some embodiments, the duration of subjection of the *Chlorella sorokiniana* UTEX 1230 to each of the n media of the series is independently selected from about 5 to about 25 days, for example from about 6 to about 24 days, from about 7 to about 23 days, from about 8 to about 22 days, from about 9 to about 21 days, from about 10 to about 20 days, from about 11 to about 19 days, from about 12 to about 18 days, from about 13 to about 17 days, from about 14 to about 16 days or about 15 days.

Each of the n media should conventionally be maintained at a temperature of from 20 to about 40° C. For example, each of the n media may be maintained at a temperature of from about 21° C. to about 39° C., from about 22° C. to about 38° C., from about 23° C. to about 37° C., from about 24° C. to about 36° C., from about 25° C. to about 35° C., from about 26° C. to about 34° C., from about 27° C. to about 33° C., from about 28° C. to about 32° C., or from about 29° C. to about 31° C. In some embodiments, each of the n media is maintained at a temperature of from about 20 to about 30° C., from about 21° C. to about 29° C., from about 22° C. to about 28° C., from about 23° C. to about 27° C., or from about 24° C. to about 26° C.

The mode of illumination of the *C. sorokiniana* UTEX 1230 within each of the n media to which it is subjected may be independently determined. As such, it will be independently selected for each of the n media whether illumination is constant or comprises dark period-to-light period cycling. In the latter alternative, typically each dark period is of y hours (h), each light period is of (24−y) h and y is from about 6 to about 12, preferably from about 7 to about 11, or more preferably from about 8 to about 10. In some embodiments, in the dark period-to-light period cycling, y is from about 6 to about 10, for example from about 7 to about 9, or about 8. In certain embodiments, such dark period to light period cycling may be effected by exposing the medium to diurnal sunlight.

In any period of illumination of a given medium, the incident radiation may conventionally have an intensity of from about 1 to about 1000 mW/cm$^2$, for example from about 10 to 1000 mW/cm$^2$, from about 10 to about 500 mW/cm$^2$ or from about 50 to about 500 mW/cm$^2$. It is noted that the standard irradiance of sunlight is about 90 to about 110 mW/cm$^2$ and, as such, it is not precluded that sunlight may have utility in the present disclosure.

The following examples are provided solely for illustration and are not to be construed as limitations of the present disclosure, as many variations thereof are possible without departing from the scope of the present disclosure.

EXAMPLES

The following examples demonstrate a method of cultivating algal biomass using oil field hypersaline brine (HSB). The examples are provided solely for illustration and are not to be construed as limitations of the present disclosure, as many variations thereof are possible without departing from the scope of the present disclosure.

Example 1: Microalgae Strain and Inoculum Preparation

All experiments utilized the freshwater microalgae species *C. sorokiniana* (UTEX 1230), obtained from the University of Texas at Austin, USA. A colony of *C. sorokiniana* (UTEX 1230) cells was transferred to a 500 milliliters (mL) conical flask containing 200 mL of the UTEX protease medium for the initial culture stage. The microalgal cells were incubated under continuous white fluorescent light at an intensity of 1800-1900 LUX, while the temperature was maintained at 22±1 degrees Celsius (° C.) without aeration. Once the culture reached the desired concentration, with an optical density ($OD_{680}$) of at least 4.2, 50 mL of the microalgal sample was extracted from the flask to serve as inoculum for the subsequent experimental stages.

Example 2: Synthetic Oil Field HSB

To closely replicate the composition and characteristics of actual HSB generated during petroleum extraction, this process involves a detailed analysis of the composition of authentic HSB derived from specific oil reservoirs. In this study, HSB is created by precisely blending various salts to achieve the intended composition as accurately as possible. The selection of salts and their concentrations is designed to match the characteristics of real HSB. The synthetic HSB used in these experiments was adapted from previously published formulations (See: Dardor, D., Al-Maas, M., Minier-Matar, J., Janson, A., Sharma, R., Hassan, M. K., Al-Maadeed, M. A. A., Adham, S., *Protocol for Preparing Synthetic Solutions Mimicking Produced Water from Oil and Gas Operations*. ACS Omega 2021, 6, 6881-6892, the disclosure of which is incorporated herein by reference in its entirety) to serve as a model for actual oilfield HSB. The composition of HSB that was employed during this study had the following composition: 16.75 grams per liter (g/L) sodium chloride (NaCl), 28.39 g/L calcium chloride dihydrate ($CaCl_2 \cdot 2H_2O$), 4.18 g/L magnesium chloride hexahydrate ($MgCl_2 \cdot 6H_2O$), 0.45 g/L potassium chloride (KCl), 1.14 g/L sodium sulfate ($Na_2SO_4$) and 0.34 g/L strontium chloride ($SrCl_2 \cdot 6H_2O$).

Example 3: Synthetic Municipal Wastewater (SMW)

Secondary municipal wastewater treatment produces treated wastewater, often referred to as tertiary municipal wastewater, which contains valuable nutrients such as nitrogen and phosphorus. This resource can be effectively used to support microalgal growth, enhancing sustainability and reusability (See: Faruque, M. O., Hossain, M. M., Farooq, W., Razzak, S. A., *Phototrophic Bioremediation of Municipal Tertiary Wastewater Coupling with Lipid Biosynthesis Using Scenedesmus dimorphus: Effect of Nitrogen to Phosphorous Ratio with/without $CO_2$ Supplementation*. Sustainability 2023, 15, 1409 the disclosure of which is incorporated herein by reference in its entirety). Based on this potential, synthetic wastewater was utilized to develop a simulated tertiary municipal wastewater system. The formulation of the synthetic wastewater replicated the concentration and composition of trace elements found in Bold's Basal Medium (BBM). The composition of BBM is as follows (in $mgL^{-1}$): 250 milligrams (mg) sodium nitrate (NaNO$_3$); 25 mg CaCl$_2$·2H$_2$O; 75 mg magnesium sulfate heptahydrate (MgSO$_4$·7H$_2$O); 75 mg dipotassium phosphate (K$_2$HPO$_4$); 25 mg NaCl, 175 mg monopotassium phosphate (KH$_2$PO$_4$); 50 mg alkaline ethylene diamine tetraacetic acid (EDTA); 11.45 mg boric acid (H$_3$BO$_3$); 4.98 mg acidified ferrous sulfate heptahydrate (FeSO$_4$·7H$_2$O); and, 1 milliliter per liter of trace elements. The trace element solution is prepared by dissolving 8.82 grams (g) of zinc sulfate heptahydrate (ZnSO$_4$·7H$_2$O), 0.49 g of cobalt (II) chloride hexahydrate (CoCl$_2$·6H$_2$O), and 1.44 g of manganese (II) chloride tetrahydrate (MnCl$_2$·4H$_2$O), 1.57 g of copper sulfate heptahydrate (CuSO$_4$·5H$_2$O), and 0.71 g of molybdenum trioxide (MoO$_3$) in 1 liter (L) of distilled water.

Example 4: Progressive Adaptation Strategy

For the initial cultivation, 50 mL of the prepared inoculum was added to 800 mL of synthetic municipal wastewater (SMW), resulting in a total working volume of 850 mL in a 1 L Erlenmeyer flask. Borosilicate glass Erlenmeyer flasks, known for their conical shape, wide flat bottom, and tapered neck, were used as batch photobioreactors. The photobioreactor contained 0% HSB, including only SMW medium (low saline) and the microalgae strains. At the beginning of the experimental trial, the initial optical density (OD$_{680}$) of the microalgae sample in the photobioreactor ranged from 0.375 to 0.4 due to the addition of the inoculum. Prior to inoculation, the SMW medium was adjusted to an initial pH of 6.8 by adding 1 M NaOH. The medium was then sterilized through autoclaving at 120° C. for 15 minutes. To prevent contamination, the photobioreactors were tightly sealed with foam stoppers. Under a fume hood, the photobioreactors were illuminated by four horizontally positioned white fluorescent tubes covering a significant portion of the surface area. The light intensity at the reactor surface was measured to be between 1800 and 1900 LUX using a Fisher Scientific™ Traceable™ Dual-Display Light Meter. The experiment was conducted until the stationary phase was reached, maintaining temperature conditions of 22±1° C.

The air-CO$_2$ mixing system FC-SH (Live Cell Instruments, South Korea) was used to aerate the system's hydrodynamics. The air flow rate was controlled by a glass rotameter on the mixing device, and it was maintained at 1500 cubic centimeter per minute (cc/min) as needed. Gas bubbles are generated inside the liquid cultured medium and are released via the upper part of the reactor, thereby avoiding the settling of the cells. To avoid the settling of microalgae, the photobioreactor was agitated manually three times daily. C. sorokiniana UTEX 1230 was grown in a phototrophic environment, where the culture medium was supplied with inorganic carbon (atmospheric air).

Table 1 provides a detailed characterization of HSB media supplemented with synthetic municipal wastewater (SMW) across varying loading percentages, revealing significant trends in pH, electrical conductivity (EC), total dissolved solids (TDS), salinity, total nitrogen (TN), and total phosphorus (TP). As HSB loading increases from 0% to 60%, pH decreases from 6.65 to 5.46, suggesting that higher salinity contributes to a more acidic environment, which may impact the growth and metabolism of C. sorokiniana UTEX 1230. Correspondingly, EC values rise sharply from 0.962 milliSiemens per centimeter (mS/cm) to 55.31 mS/cm, reflecting a higher concentration of ionic constituents typical of hypersaline conditions, which could lead to increased osmotic stress on the microalgae. Both TDS and salinity also show significant increases, with TDS escalating from 0.553 grams per liter (g/L) to 27.59 g/L and salinity from 0.42 g/L to 34.46 g/L, underscoring the rising ionic concentration critical for microalgal growth and nutrient dynamics. Conversely, TN and TP concentrations decline, with TN dropping from 41.18 milligram per liter (mg/L) to 14.0 mg/L and TP from 53.25 mg/L to 22.3 mg/L as HSB loading increases, indicating that higher salinity may inhibit the availability of these essential nutrients, potentially limit biomass production and affecting nutrient uptake efficiency. Overall, these findings highlight the intricate relationships between salinity, nutrient availability, and the physicochemical properties of the growth medium, which are essential for optimizing the cultivation of C. sorokiniana UTEX 1230 in hypersaline environments with integrated SMW as a nutrient source.

TABLE 1

Characterization of HSB media supplemented with SMW.

| HSB loading (%) | pH | EC (mS/cm) | TDS (g/L) | Salinity (g/L) | TN (mg/L) | TP (mg/L) |
| --- | --- | --- | --- | --- | --- | --- |
| 0 | 6.65 | 0.962 | 0.553 | 0.42 | 41.18 | 53.25 |
| 10 | 5.88 | 11.47 | 5.75 | 6.50 | 35.33 | 36.24 |
| 20 | 5.75 | 20.81 | 10.39 | 12.37 | 27.6 | 30.55 |
| 30 | 5.61 | 29.60 | 14.81 | 18.27 | 25.0 | 27.82 |
| 40 | 5.54 | 37.94 | 18.98 | 24.04 | 20.0 | 26.4 |
| 50 | 5.46 | 46.74 | 23.32 | 30.29 | 18.0 | 25.0 |
| 60 | 5.46 | 55.31 | 27.59 | 34.46 | 14.0 | 22.3 |

Figure 1B:
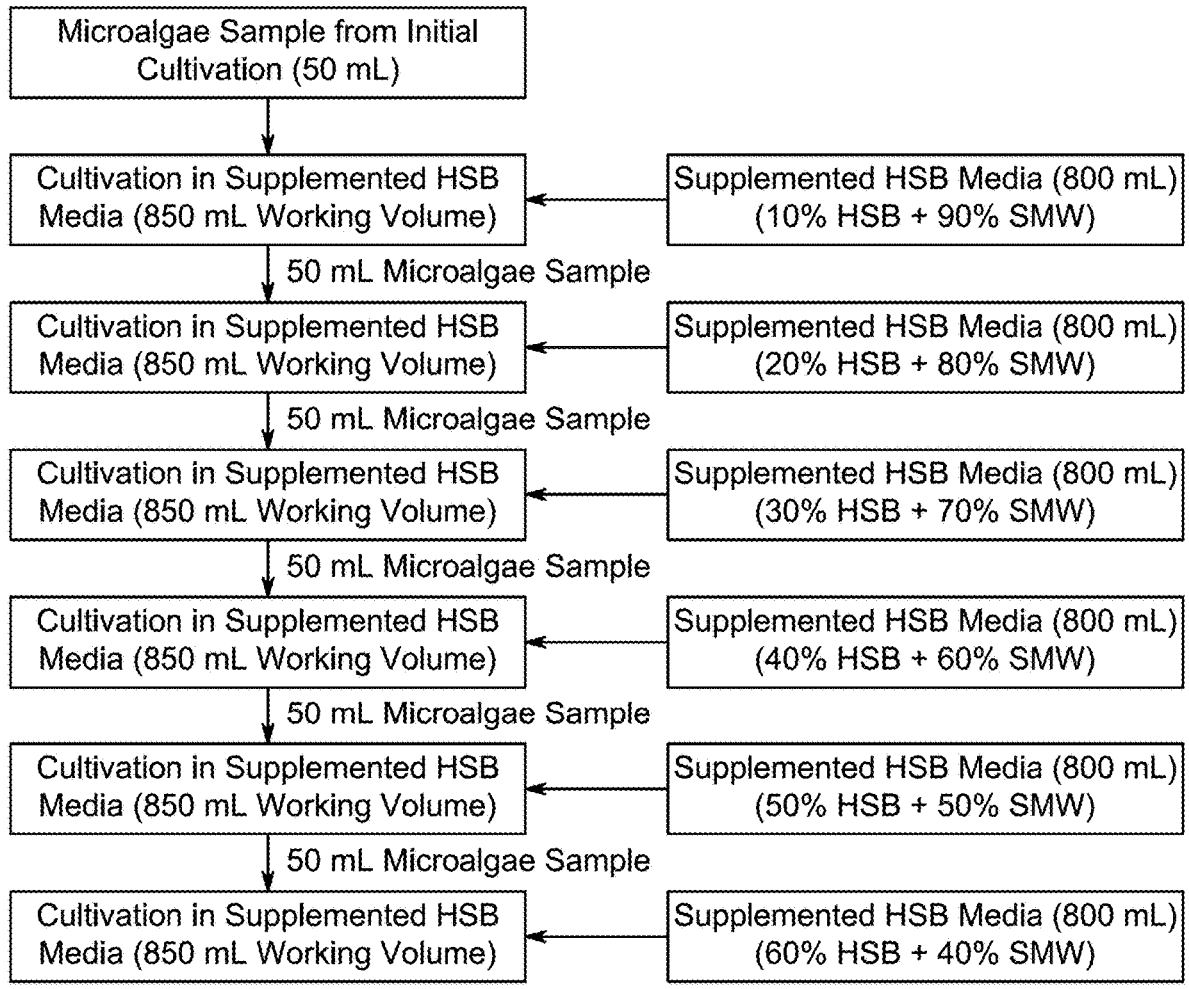
FIG. 1B illustrates a flow chart of an exemplary progressive adaptation strategy of microalgae in oilfield hypersaline brine (HSB) media, according to certain embodiments.

FIG. 1B illustrates the progressive adaptation strategy of C. sorokiniana UTEX 1230 in HSB media. This figure illustrates a systematic, stepwise methodology for culturing microalgae in supplemented HSB media. The primary aim of this experimental setup is to progressively adapt the microalgae to varying salinity levels by incrementally adjusting the ratio of HSB to synthetic municipal wastewater (SMW) in the cultivation media. The process begins with a 50 mL microalgae sample from a previous cultivation setup, which forms the starting point for the subsequent phases of adaptation. In each phase of the experiment, the microalgae are cultured in 850 mL of supplemented HSB media, with different ratios of HSB and SMW. After each cultivation phase, a 50 mL sample of the microalgae is transferred to a new batch of supplemented media. This process is repeated through multiple stages, with the HSB and SMW proportions systematically adjusted in each phase. The initial media consists of a 10% HSB and 90% SMW mixture, with the HSB proportion gradually increasing to 60% HSB and 40% SMW by the final phase. As the salinity levels rise due to the increasing HSB percentage, the microalgae face more challenging conditions, allowing researchers to assess how the organisms adapt and potentially thrive under these saline environments. As the concentration of HSB increases and the amount of SMW decreases, the microalgae are exposed to different nutrient and osmotic conditions. This progressive variation allows for a detailed study of the microalgae's resilience, including evaluations of their growth, nutrient uptake, biomass production, and overall performance in key applications such as bioenergy production and bioremediation. The strategy outlined in the figure is aimed at understanding how microalgae can be gradually adapted to thrive in saline environments over time. It also seeks to optimize the use of HSB in combination with synthetic municipal wastewater to create conditions under which the microalgae can not only survive but also perform effectively under more extreme circumstances. This approach is also intended to improve nutrient removal efficiency, boost biomass production, and enhance the bioenergy potential of the microalgae when cultured under varying salinity conditions. The progressive adaptation strategy demonstrated in this experiment is crucial for the development of microalgae-based systems designed for bioenergy production, wastewater treatment, and bioremediation in challenging environmental conditions. The incremental increase in salinity offers a practical means of fine-tuning the microalgae's growth conditions, which is essential for scaling up such applications for large-scale use.

Example 5: Analytical Methods

Before sampling for algal growth determination, sterile water was added to photobioreactor to adjust the volume loss of cultivation medium due to evaporation. 15 mL samples were collected maintaining 24 hours (h) duration to measure the optical density (OD), dry biomass concentration and pH of the culture medium. The absorbance of microalgae samples was measured at a wavelength of 680 nanometers (nm) in comparison to a blank sample in order to determine the OD of the medium used for the culture of microalgae (See: Parsy, A., Sambusiti, C., Baldoni-andrey, P., Elan, T., Périé, F., *Cultivation of Nannochloropsis oculata in saline oil & gas wastewater supplemented with anaerobic digestion effluent as nutrient source. Algal Res.* 2020, 50, 101966, the disclosure of which is incorporated herein by reference in its entirety.) using a UV-VIS spectrophotometer (Evolution 260 Bio-Thermo Scientific). The necessary dilution of culture medium was maintained to measure the OD accurately when OD was found greater than one. To determine the dry cell (biomass) content of microalgae, 15 mL portions of the culture medium was centrifuged and washed with distilled water twice to remove the surface salts from the biomass. After that, biomass with distilled water was vacuum filtered using pre-dried and pre-weighed glass microfiber filter paper (Whatman GF/C with a 0.45 μm pore size and 0.47 mm diameter). The filter paper with the biomass was subjected to 24 h of drying in an oven at 60° C. before reweighing. The difference in weight before and after drying was utilized to compute the microalgae dry cell content. This measured dry weight was served as the basis for determining the biomass concentration in milligrams per liter (mg/L) (Razzak, S. A., *In situ biological $CO_2$ fixation and wastewater nutrient removal with Neochloris oleoabundans in batch photobioreactor. Bioprocess Biosyst. Eng.* 2019, 42, 93-105, the disclosure of which is incorporated herein by reference in its entirety.).

The specific growth rate, denoted as $\mu_g$, was calculated using the following Equation 1, where it represents the rate at which the dry biomass weight increases per day (See: Ammar, S. H., Khadim, H. J., Mohamed, A. I., *Cultivation of Nannochloropsis oculata and Isochrysis galbana microalgae in produced water for bioremediation and biomass production. Environ. Technol. Innov.* 2018, 10, 132-142, the disclosure of which is incorporated herein by reference in its entirety).

$$\text{Specific growth rate, } \mu_g = \frac{\ln\left(\frac{OD_t}{OD_0}\right)}{t - t_0} \quad (1)$$

where, $OD_t$ and $OD_0$ are the optical densities measured at the initial ($t_0$) and final (t) duration of the exponential growth phase.

The biomass productivity, often referred to as the biomass production rate, will be determined using the following Equation 2 (See: Tang, D., Han, W., Li, P., Miao, X., Zhong, J., $CO_2$ *biofixation and fatty acid composition of Scenedesmus obliquus and Chlorella pyrenoidosa in response to different $CO_2$ levels. Bioresour. Technol.* 2011, 102, 3071-3076, the disclosure of which is incorporated herein by reference in its entirety.):

Biomass productivity, $$P_b = \frac{X_t - X_0}{t_t - t_0} \quad (2)$$

where $X_0$ represents the initial dry biomass, weight measured at the beginning of the culture or growth phase, which occurs at time $t_0$, and $X_t$ is the dry biomass weight at the end of the cultivation phase, which is observed at time $t_t$.

To assess the nutrient removal, 10 mL microalgae culture samples were collected from the photobioreactors, the following procedures were employed:

The collected samples undergo centrifugation at 4500 rpm for a period of 10 mi. This process separated the supernatants, which was preserved for subsequent analysis.

The amounts of nitrogen and phosphorous were determined with the assistance of specialized apparatus, specifically a spectrophotometer (DR 3900-HACH, USA) and a digital reactor (DRB 200-HACH, USA). The presence of total nitrogen (TN) in the form of $N-NO_3^-$ and total phosphorus (TP) in the form of $PO_4^{3-}$ in the cultivation medium was able to be quantified with the assistance of these equipment.

The percentages of TN and TP removal rates were estimated according to the batch kinetics. This calculation was carried out using the provided Equation 3:

$$\% \text{ removal} = \frac{S_0 - S_t}{S_0} \times 100 \quad (3)$$

where $S_0$ and $S_t$ represent the substrate concentration at two specific points in time: $S_0$ is the concentration at the beginning of the cultivation, which corresponds to time $t_0$, while $S_t$ is the concentration at the end of the cultivation recorded at time $t_t$.

The sulfo-phospho-vanillin (SPV) technique was applied to estimate the lipid composition (See: Byreddy, A. R., Gupta, A., Barrow, C. J., Puri, M., *A quick colorimetric method for total lipid quantification in microalgae. J. Microbiol. Methods* 2016, 125, 28-32, the disclosure of which is incorporated herein by reference in its entirety). Canola oil was utilized to create a calibration curve following the steps outlined in the SPV method. In order to ascertain the intracellular lipid substance, 5 mL samples of microalgae were taken from the photobioreactor over several days. After centrifuging the samples for 10 minutes at 4500 rpm to eliminate any salts from the cell surface, they were further diluted as needed and then washed three times with distilled water. The biomass was exposed to 1 mL of 98% sulfuric acid before being heated to 100° C. for ten minutes. The sample was cooled in an ice bath for five minutes before being treated with 5 mL of freshly produced SPV reagent. After that, samples were shaken at a speed of 200 rpm for 15 min at 37° C. in an incubator. After incubation, the samples' absorbance was considered at 530 nm using a UV spectrophotometer. With an $R^2$ of 0.9878 from the measured absorbance, the lipid content of the samples was calculated applying the Equation 4:

$$Y_{OD530} = 0.0333 X_{lipid} + 0.1316 \qquad (4)$$

Subsequently, the total lipid content was determined by applying the Equation 5 provided, expressed as a proportion of the weight of the dry biomass.

$$\text{Lipid content (\%)} = \frac{X_L}{X_B} \times 100 \qquad (5)$$

where $X_B$ represents the dry weight of the biomass in the sample and $X_L$ represents the amount of lipid that is present in the sample.

Moreover, lipid productivity was determined based on the Equation 6 depicted by Ansari and researchers (Ansari, F. A., Singh, P., Guldhe, A., Bux, F., *Microalgal cultivation using aquaculture wastewater: Integrated biomass generation and nutrient remediation. Algal Res.* 2017, 21, 169-177, the disclosure of which is incorporated herein by reference in its entirety).

$$\text{Lipid productivity (mg/L/d)} = \qquad (6)$$
$$\text{Biomass productivity (mg/L/d)} \times \frac{\text{Lipid content (\%)}}{100}$$

Example 6: Analysis of Dry Biomass

The application of Fourier transform infrared (FTIR) spectroscopy enabled the identification of the structural and chemical bonding patterns, specifically pursuing functional groups, within several biomolecules present in the microalgal biomass. Molecular vibrational spectroscopy, such as FTIR, analyzes chemical functional groups by studying their different absorption regions, which typically range from 4000 to 500 $cm^{-1}$. The identification of cellular macromolecules (lipids, carbohydrates, and proteins) in dried algal biomass was performed using Fourier Transform Infrared (FTIR) spectroscopy (Model: Thermo Scientific Nicolet Is5).

Thermogravimetric examination of microalgae biomass yields valuable information regarding the thermal behavior of the sample. The TGA data were collected using a TGA instrument of the model STDG 600, manufactured by TA Instruments in the United States. Mass samples that were required were taken on the sample holder and heated at a rate of 10° C. per minute from ambient temperature to 800° C. in an inert environment (nitrogen). The TGA curve makes it easy to assess the moisture content (MC), fixed carbon (FC), volatile matter (VM), and ash content of biomass samples.

The PerkinElmer 2400 Series II CHNS Elemental Analyzer was utilized to determine and assess the weight proportion of hydrogen, carbon, sulfur, and nitrogen in the dried algal biomass. Using the following two Equations (Equation 7 and 8), the higher heating value (HHV) of the dried algal biomass sample was calculated based on the proximate and ultimate analysis of the biomass (See: Alves, J. L. F., Da Silva, J. C. G., Costa, R. L., Dos Santos Junior, S. F., da Silva Filho, V. F., Moreira, R. D. F. P. M., José, H. J., *Investigation of the bioenergy potential of microalgae Scenedesmus acuminatus by physicochemical characterization and kinetic analysis of pyrolysis. J. Therm. Anal. calorim.* 2019, 135, 3269-3280, the disclosure of which is incorporated herein by reference in its entirety).

$$HHV(MJKg^{-1}) = 0.3383C + 1.422\left(H - \frac{0}{8}\right) \qquad (7)$$

$$\% \text{ Oxygen} = 100 - \% \text{ of (C+H+N+S+Ash)} \qquad (8)$$

The weight percentage of carbon, hydrogen, nitrogen, sulfur, oxygen, and ash content in the algal biomass is represented by C, H, N, S, O, and Ash, respectively.

Assuming that algal protein contains 16% of nitrogen, total protein content was computed by multiplying TN content by 6.25 (N×6.25) (See: Kumar, K., Dasgupta, C. N., Das, D., *Cell growth kinetics of Chlorella sorokiniana and nutritional values of its biomass. Bioresour. Technol.* 2014, 167, 358-366, the disclosure of which is incorporated herein by reference in its entirety). The carbohydrate content in the microalgal biomass was calculated utilizing the formula provided by the work of Silva and researchers (See: Silva, D. A., Cardoso, L. G., de Jesus Silva, J. S., de Souza, C. O., Lemos, P. V. F., de Almeida, P. F., Ferreira, E. de S., Lombardi, A. T., Druzian, J. I., *Strategy for the cultivation of Chlorella vulgaris with high biomass production and biofuel potential in wastewater from the oil industry. Environ. Technol. Innov.* 2022, 25, 102204, the disclosure of which is incorporated herein by reference in its entirety). Total carbohydrate content was computed by differences applying the following Equation 9.

$$\text{Carbohydrate (\% wt.)} = 100\% - (\% \text{ moisture} + \% \text{Ash} + \% \text{ Total lipids} + \% \text{ Protein}) \qquad (9)$$

The analysis was carried out using the mean of the data from the three replicate sets of tests. To assess the level of variation across the various treatment groups, a one-way analysis of variance (ANOVA) was carried out. A difference was considered statistically significant when $p < 0.05$.

Figure 2:
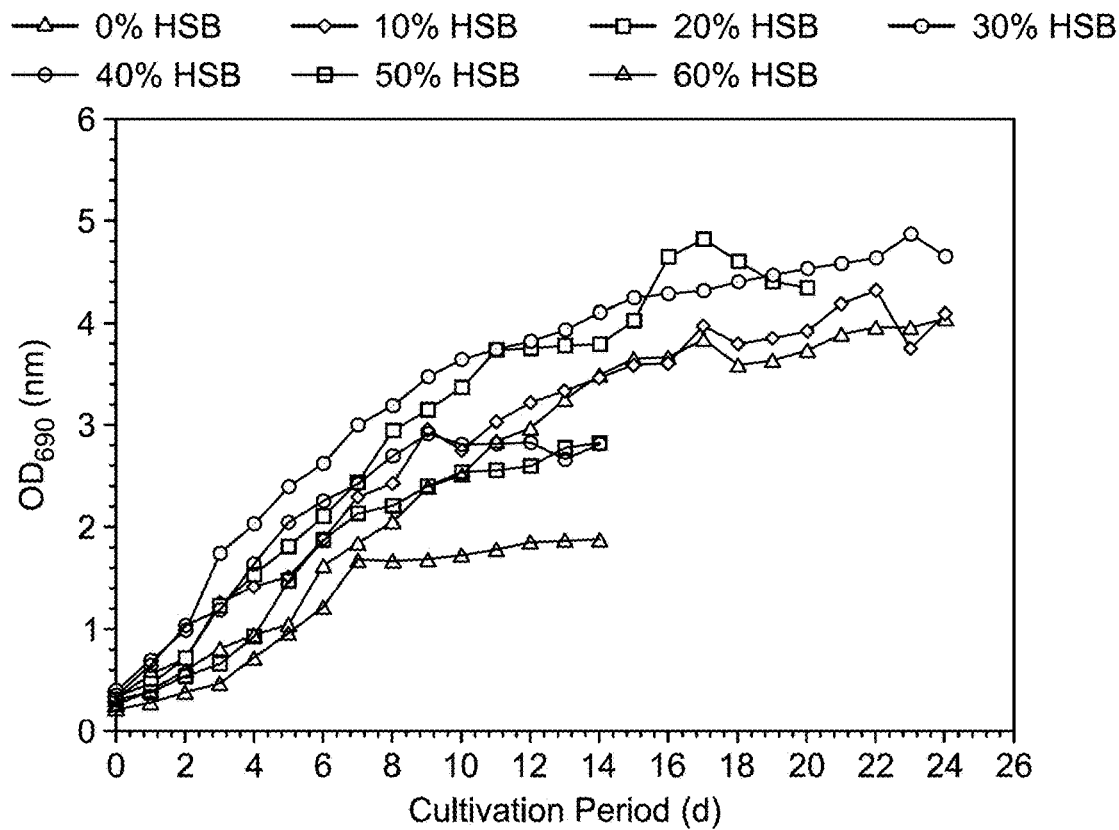
FIG. 2 shows the time profiles of optical densities ($OD_{680}$) correlating to the growth of *C. sorokiniana* UTEX 1230 in different oilfield hypersaline brine (HSB) loadings, according to certain embodiments.

Microalgae *C. sorokiniana* (UTEX 1230) was incubated in successive manner, as shown in FIG. 1B) in different levels of HSB medium supplemented with SMW as a nutrient source to evaluate the growth parameters and bioenergy potential of biomass. Table 1 represents the major characterization of different growth mediums. *C. sorokiniana* UTEX 1230 was grown in SMW (0% HSB) as an initial culture and was considered as control. FIG. 2 demonstrates the time profiles of optical densities ($OD_{680}$) as a growth feasibility of *C. sorokiniana* UTEX 1230 in different HSB loadings. According to FIG. 2, microalgae was cultured about 24 days for medium with lower HSB loadings (up to 30%). However, for medium with higher HSB loadings (up to 60%), incubation lasted for about 14 days. This resultant variation of cultivation period may be due to the associated salinity stress prevailing in different concentration of HSB medium (See: Haris, N., Manan, H., Jusoh, M., Khatoon, H., Katayama, T., Kasan, N. A., *Effect of different salinity on the growth performance and proximate composition of isolated indigenous microalgae species. Aquac. Reports* 2022, 22, 100925, the disclosure of which is incorporated herein by reference in its entirety). Generally, cultivation medium with higher HSB loadings consist of higher salinities as reported in Table 1. Due to the utilization of preadapted microalgae cells in each stage culture, lag phase was avoided in the culture of all photobioreactors except 40% and 50% HSB loadings photobioreactors. The exponential phase was initiated in these two photobioreactors with increased HSB loadings after a single day of incubation. It is seen that common end of exponential growth phase was observed on day 17 in the photobioreactors having the culture media of 0%, 10%, and 20% HSB loadings. However, the photobioreactor with 30% HSB grew well until day 23. Furthermore, the photobioreactors with 50% HSB and 60% HSB grew exponentially until day 7, whereas it was day 9 for photobioreactors with 40% HSB loadings.

As can be seen in FIG. 2, microalgae culture in SMW (0% HSB) showed the fair optical density (OD) values during the cultivation period and reached the maximum OD values ($OD_{680}$=4.04) on day 24. However, there was a slight drop in OD values on day 18 and maintained a slow growth pattern for the rest of the cultivation period. During the 10% HSB loadings, experiment was performed with a mix including microalgae sample from the initial culture (50 mL) and a media composed of 10% HSB (v/v) and 90% SMW (v/v) to complete the total volume. It is seen that *C. sorokiniana* adapted well in relatively higher saline medium and maintained a better growth profile during the whole cultivation period than that of control (0% HSB). The maximum OD values ($OD_{680}$=4.32) achieved on day 22 at the end of stationary phase. It indicates that enrichment of HSB medium with SMW increased the OD values by 12.62% and found overall growth pattern statistically significant ($p<0.05$). Considering 20% HSB loadings, experiments were conducted in a similar manner. It is seen that microalgae *C. sorokiniana* UTEX 1230 revealed better adaptation in incremental saline medium and showed relatively better growth pattern than that of control and medium with 10% HSB loadings. Maximum OD values ($OD_{680}$=4.825) attained on day 17 before declining the growth curve. There is a noticeable increase in maximum OD values by 25.78% for 20% HSB loadings than that of control and found overall growth pattern statistically significant ($p<0.05$). It is noteworthy that microalgae in 30% HSB medium showed the highest OD values during the cultivation period compared to the control and other tested cultivation media. Maximum OD values ($OD_{680}$=4.88) reached on day 23 before dropping the growth curve. The maximum OD values recorded for 30% HSB loadings is statistically significantly higher than those of others HSB loadings including control ($p<0.05$). As observed in FIG. 2, microalgae *C. sorokiniana* UTEX 1230 revealed the better growth pattern successively until 30% HSB loadings. It indicates that progressive adaptation helps the *C. sorokiniana* UTEX 1230 to grow well in incremental saline environment (See: Parsy, A., Sambusiti, C., Baldoni-andrey, P., Elan, T., Périe, F., *Cultivation of Nannochloropsis oculata in saline oil & gas wastewater supplemented with anaerobic digestion effluent as nutrient source. Algal Res.* 2020, 50, 101966, the disclosure of which is incorporated herein by reference in its entirety). After that, relatively decreased growth profile was seen for 40%, 50% and 60% HSB loadings medium due to the hypersaline environment.

Considering 40% HSB loadings, microalgae grew well compared to that of the control until day 9 and its highest growth was showed on that day with OD values ($OD_{680}$=2.92). Subsequently its growth began to decay slowly for the rest of the cultivation period. Thinking of the successive culture with 50% HSB loadings, microalgae displayed very slow growth until day 3. Later, growth rose rapidly until day 7 before starting a slow growth phase until the rest of the cultivation period and reached the highest OD values ($OD_{680}$=2.824) on day 14. Lastly, the 60% HSB loadings presented lower growth of *C. sorokiniana* UTEX 1230, where microalgae grew very slowly until day 4. After that, microalgae grew gradually until day 7 and remained almost constant during the rest of the period attaining the highest OD value ($OD_{680}$=1.88) on day 14. It is seen that there is a 53.46% reduction in maximum OD values obtained for 60% HSB loadings compared to the control and found overall growth pattern statistically significant ($p<0.05$). As anticipated, a significant decrease in growth was observed for HSB loadings of 40%, 50%, and 60% (v/v) consecutively. This is likely due to excessively high salinity levels, specifically 24.04 g/L, 30.29 g/L, and 34.46 g/L for the respective HSB loadings. These salinity values are too high for the growth of the freshwater microalgae *C. sorokiniana* UTEX 1230. Microalgae have significant challenges due to environmental stress caused by high salinity. Unicellular photosynthetic microalgae, such as *C. sorokiniana* UTEX 1230, are particularly susceptible to ionic imbalance, osmotic stress, and interference from reactive oxygen species (ROS) that disrupt their photosynthesis (Nadersha, S., Aly Hassan, A., 2022. *Biodesalination and treatment of raw hypersaline produced water samples using indigenous wastewater algal consortia. Desalination* 2022, 528, 115638, the disclosure of which is incorporated herein by reference in its entirety). Due to the successive reduced growth pattern observed cultivation with 40% HSB loadings and so on, experiment was not conducted beyond 60% HSB loadings.

Table 2 mainly describes the growth kinetics parameters such as maximum specific growth rate ($\mu_{max}$), and maximum biomass productivity ($P_{max}$) of *C. sorokiniana* UTEX 1230 cultivated under the different HSB loadings. As appeared in Table 2, the value of maximum specific growth rates at HSB loadings of 0%, 10%, 20%, 30%, 40%, 50% and 60% were 0.16, 0.15, 0.16, 0.14, 0.23, 0.21, 0.29 day$^{-1}$ (d$^{-1}$) respectively. According to the results obtained, maximum specific growth rate for 10%, 20%, and 30%, HSB loadings were closer to each other and found closer to control. The overall findings of the specific growth rate acquired in this study was similar to the specific growth rate found by Ammar and researchers (2018) during their PW treatment work done by two marine microalgae species (See: Ammar, S. H., Khadim, H. J., Mohamed, A. I., *Cultivation of Nannochloropsis oculata and Isochrysis galbana microalgae in produced water for bioremediation and biomass production. Environ. Technol. Innov.* 2018, 10, 132-142, the disclosure of which is incorporated herein by reference in its entirety). In addition, Table 2 shows the biomass productivity of microalgae culturing at different HSB loadings. Maximum biomass productivity for 0%, 10%, 20%, 30%, 40%, 50% and 60% HSB was found to be about 35.3 mg/L/d, 39.5 mg/L/d, 48.0 mg/L/d, 53.9 mg/L/d, 47.2 mg/L/d, 44.2 mg/L/d, and 11.2 mg/L/d respectively. The obtained results of biomass productivity for different HSB loadings except 60% HSB are 1.5 to 1.1 times higher than that of 0% HSB (control). The range of biomass productivity found in this study is supported by comparable results of other researchers (See:

Kobayashi, N., Noel, E. A., Barnes, A., Watson, A., Rosenberg, J. N., Erickson, G., Oyler, G. A., 2013. *Characterization of three Chlorella sorokiniana strains in anaerobic digested effluent from cattle manure. Bioresour. Technol.* 2013, 150, 377-386, the disclosure of which is incorporated herein by reference in its entirety).

TABLE 2

Conditions and growth parameters of *C. sorokiniana* UTEX 1230 cultivated in supplemented HSB.

| HSB loading (%) | Salinity (g/L) | Maximal $OD_{680}$ | Max. specific growth rate, $\mu m$ $(d^{-1})$ | Cultivation Period (d) | Max. Biomass productivity (mg/L/d) |
|---|---|---|---|---|---|
| 0 | 0.42 | 4.04 | 0.16 | 24 | 35.3 |
| 10 | 6.50 | 4.32 | 0.15 | 24 | 39.5 |
| 20 | 12.37 | 4.82 | 0.16 | 20 | 48.0 |
| 30 | 18.27 | 4.88 | 0.14 | 24 | 53.9 |
| 40 | 24.04 | 2.92 | 0.23 | 14 | 47.2 |
| 50 | 30.29 | 2.82 | 0.21 | 14 | 44.2 |
| 60 | 34.46 | 1.88 | 0.29 | 14 | 11.2 |

It is noted that the highest maximum biomass productivity (53.9 mg/L/d) was measured for 30% HSB, which was linked to the lowest maximum specific growth rate (0.14 $d^{-1}$) for same percentage of HSB loadings. Under saline conditions, microalgae may face several challenges such as osmotic stress, ionic imbalance and toxicity that can affect their specific growth rate (See: Salama, E. S., Kim, H. C., Abou-Shanab, R. A. I., Ji, M. K., Oh, Y. K., Kim, S. H., Jeon, B. H., *Biomass, lipid content, and fatty acid composition of freshwater Chlamydomonas mexicana and Scenedesmus obliquus grown under salt stress. Bioprocess Biosyst. Eng.* 2013, 36, 827-833, the disclosure of which is incorporated herein by reference in its entirety). However, despite these limitations on growth rate, microalgae cultures can still exhibit high biomass productivity under moderate saline conditions like 30% HSB loadings due to their ability to adapt to such environments and continue producing biomass, even though at a slower rate. On the other hand, the highest maximum specific growth rate (0.29 $d^{-1}$) was evaluated for 60% HSB, which was linked to the lowest maximum biomass productivity (11.2 mg/L/d) for equal percentage of HSB loadings. Although, the relationship between specific growth rate and biomass productivity is generally positive, however, it is possible for a microalgae culture to exhibit a high specific growth rate while still having low biomass productivity under saline conditions. This may be due to the presence of high salinity level at 60% HSB loadings. Because, salinity stress can divert energy away from biomass production and towards mechanisms for osmoregulation or defense against oxidative stress (See: Shetty, P., Gitau, M. M., Maróti, G., *Salinity stress responses and adaptation mechanisms in eukaryotic green microalgae. Cells* 2019, 8, 1-16.). As a result, even though the cells are growing rapidly, they may not accumulate biomass as efficiently as they would under optimal conditions. Moreover, in a saline environment, light penetration may be reduced due to factors such as increased scattering or absorption by dissolved salts. This can limit the amount of light available to the microalgae for photosynthesis, thereby reducing their overall biomass productivity despite a high specific growth rate (See: Neachell, E., *Book Review—Environmental flows: Saving rivers in the third millennium. River Res. Appl.* 2014, 30, 132-133, the disclosure of which is incorporated herein by reference in its entirety.). The comparable growth kinetics parameters obtained in this study for freshwater microalgae *C. sorokiniana* UTEX 1230 cultivated under different HSB loadings medium confirms its halotolerant capacity.

Figure 3:
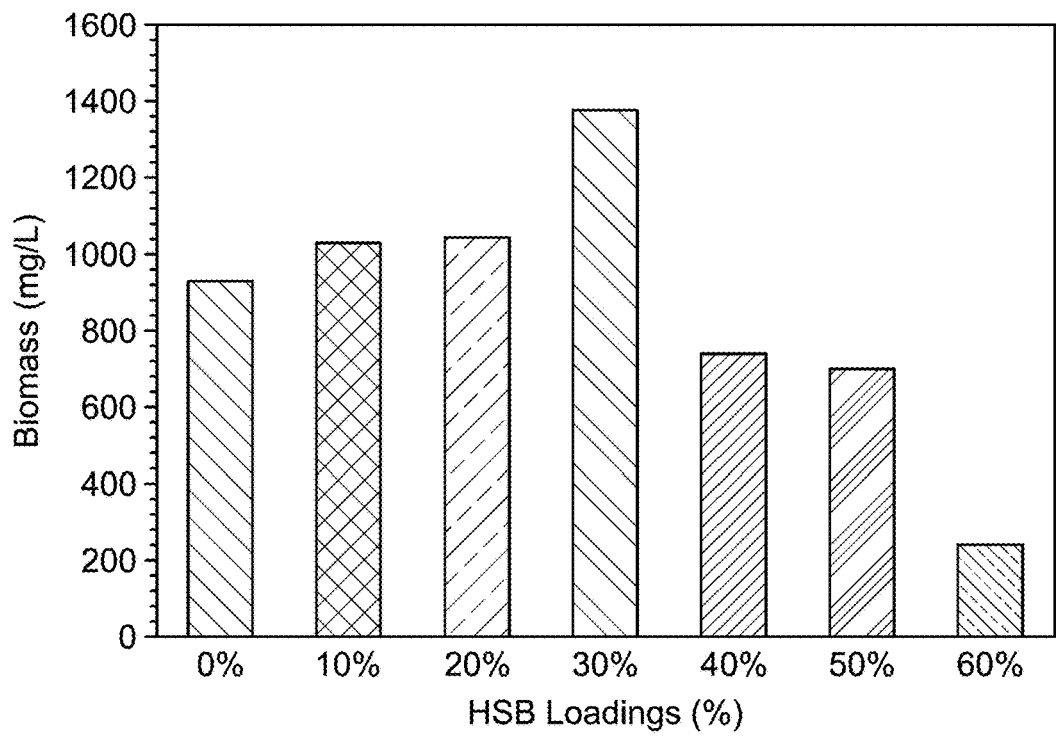
FIG. 3 shows the maximum biomass concentration obtained from the cultivation of *C. sorokiniana* UTEX 1230 under different oilfield hypersaline brine (HSB) loadings, according to certain embodiments.

The maximum biomass yields obtained from *C. sorokiniana* UTEX 1230 culture with varying HSB loadings (0% to 60%) are shown in FIG. 3. Considering all HSB loadings, the average maximal biomass output was found to vary from 237 mg/L to 1373 mg/L. Microalgae culture with 30% HSB showed the highest biomass concentration (1373 mg/L) whereas, as expected, lowest biomass concentration (237 mg/L) was obtained for 60% HSB loadings. It is seen that biomass attained for 10%, 20% and 30% HSB loadings is higher than that of control (0% HSB), whereas biomass achieved for 40%, 50% and 60% HSB loadings is lower than that of control (0% HSB). Thus, it is obvious that supplementation of HSB with SMW up to certain levels (30% HSB) enhances the microalgal growth to accumulate more biomass concentration. Because moderate salinity levels can provide an optimal environment for microalgal growth by helping to maintain osmotic balance and providing essential nutrients (See: Haris, N., Manan, H., Jusoh, M., Khatoon, H., Katayama, T., Kasan, N. A., Effect of different salinity on the growth performance and proximate composition of isolated indigenous microalgae species. *Aquac. Reports* 2022, 22, 100925, the disclosure of which is incorporated herein by reference in its entirety). It is noted that after a certain level of salinity, biomass concentration decreased with increase in salinity that means increasing HSB loadings in the culture medium. This findings is corroborated with the other reported work (See: Hopkins, T. C., Sullivan Graham, E. J., Schuler, A. J., *Biomass and lipid productivity of Dunaliella tertiolecta in a produced water-based medium over a range of salinities. J. Appl. Phycol.* 2019, 31, 3349-3358, the disclosure of which is incorporated herein by reference in its entirety; Parsy, A., Sambusiti, C., Baldoniandrey, P., Elan, T., Périé, F., *Cultivation of Nannochloropsis oculata in saline oil & gas wastewater supplemented with anaerobic digestion effluent as nutrient source. Algal Res.* 2020, 50, 101966, the disclosure of which is incorporated herein by reference in its entirety). Maximum biomass yields obtained in this study for different HSB loadings were higher in some cases than those of similar study conducted by Eladel and researchers (2019). For example, Eladel and researchers (2019) cultivated the *C. sorkokiniana* UTEX 1230 under municipal wastewater medium and BBM enriched wastewater medium for simultaneous nutrient removal and biodiesel production. According to their findings maximum biomass concentration was in the range of 747 mg/L to 833 mg/L which was lower in some cases than compared to this disclosure (See: Eladel, H., Abomohra, A. E. F., Battah, M., Mohmmed, S., Radwan, A., Abdelrahim, H., *Evaluation of Chlorella sorokiniana isolated from local municipal wastewater for dual application in nutrient removal and biodiesel production. Bioprocess Biosyst. Eng.* 2019, 42, 425-433, the disclosure of which is incorporated herein by reference in its entirety).

Figure 4A:
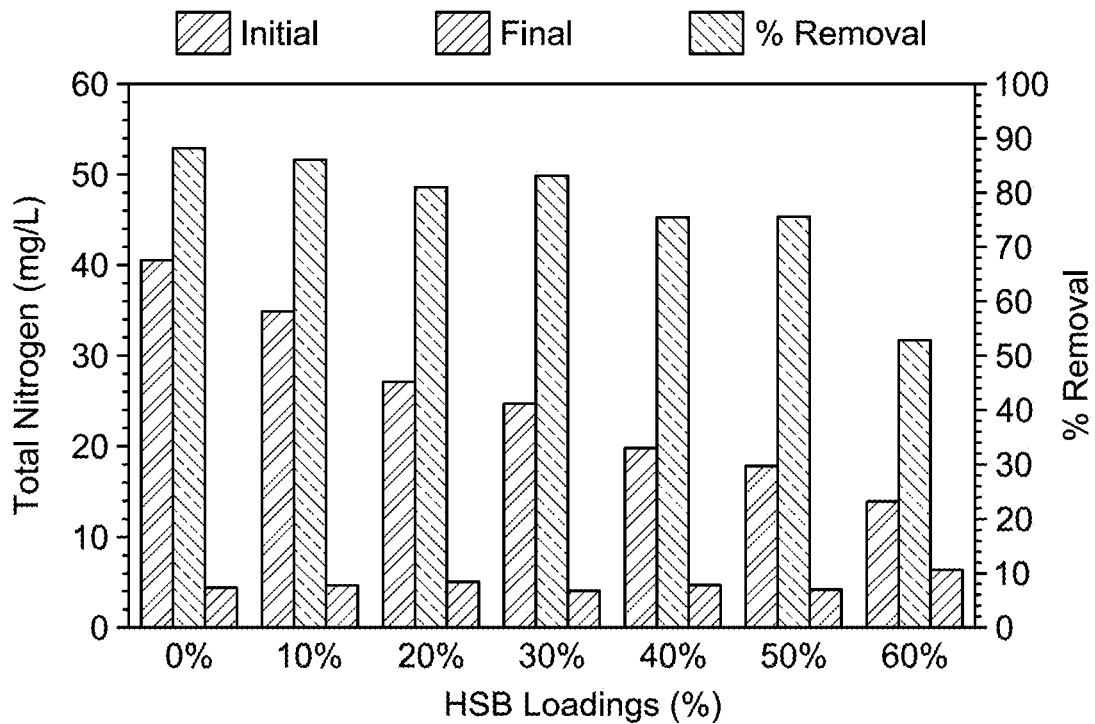
FIG. 4A shows initial and final concentration and percentage removal of total nitrogen (TN) in the culture medium under different oilfield hypersaline brine (HSB) loadings, according to certain embodiments.

Microalgae can uptake nitrogen (N) and phosphorus (P) from wastewater as nutrients for their growth and metabolic interest (See: Yang, Q., Zhang, M., Alwathnani, H. A., Usman, M., Mohamed, B. A., Abomohra, A. E. F., Salama, E. S., *Cultivation of Freshwater Microalgae in Wastewater Under High Salinity for Biomass, Nutrients Removal, and Fatty Acids Biodiesel Production. Waste and Biomass Valorization* 2022, 13, 3245-3254, the disclosure of which is incorporated herein by reference in its entirety). HSB mimicked in this disclosure does not contain any nitrogen or phosphorus. Thus, HSB was supplemented with SMW as a major source of nutrients for microalgal growth. Due to the supplementation with SMW, the photobioreactor having the dilutions of 0%, 10%, 20%, 30%, 40%, 50%, and 60% of HSB showed that the initial average nitrogen values for each dilution were 41.17 mg/L, 35.34 mg/L, 27.5 mg/L, 25 mg/L, 20 mg/L, 18 mg/L, and 14 mg/L respectively. To investigate the nutrient uptake capacity of C. sorokiniana UTEX 1230 under the HSB environment, two primary nutrients (N and P) were monitored after the respective cultivation period. FIG. 4A demonstrates the TN content measured in the culture medium of different HSB loadings at the beginning and at the end of cultivation periods. As can be observed in FIG. 4A, initial nitrogen concentration decreased with an increase in HSB loadings. Generally, it is seen that nitrogen concentration decreased significantly with increase in microalgal growth considering all HSB loadings. At the end of the cultivation period, nitrogen concentration reduced to around 4.5 mg/L, 4.6 mg/L, 5.0 mg/L, 4.0 mg/L, 4.7 mg/L, 4.2 mg/L, and 6.5 mg/L in the photobioreactor having the HSB loadings of 0%, 10%, 20%, 30%, 40%, 50%, and 60% respectively, representing 89.1%, 86.98%, 81.81%, 84%, 76.5%, 76.7%, and 53.57% removal of nitrogen. Generally, it is true that nitrogen uptake is favored by microalgal growth and depends on initial nitrogen concentration (See: Ji, M. K., Yun, H. S., Park, Y. T., Kabra, A. N., Oh, I. H., Choi, J., *Mixotrophic cultivation of a microalga Scenedesmus obliquus in municipal wastewater supplemented with food wastewater and flue gas CO$_2$ for biomass production. J. Environ. Manage.* 2015, 159, 115-120, the disclosure of which is incorporated herein by reference in its entirety; Rahmani, A., Zerrouki, D., Tabchouche, A., Djafer, L., *Oilfield-produced water as a medium for the growth of Chlorella pyrenoidosa outdoor in an arid region. Environ. Sci. Pollut. Res.* 2022, 87509-87518, the disclosure of which is incorporated herein by reference in its entirety). The percentage removal of nitrogen (in the form of nitrate) obtained in this disclosure is in good agreement with the findings of the other reported work (See: Eladel, H., Abomohra, A. E. F., Battah, M., Mohmmed, S., Radwan, A., Abdelrahim, H., *Evaluation of Chlorella sorokiniana isolated from local municipal wastewater for dual application in nutrient removal and biodiesel production. Bioprocess Biosyst. Eng.* 2019, 42, 425-433, the disclosure of which is incorporated herein by reference in its entirety; Rahmani, A., Zerrouki, D., Tabchouche, A., Djafer, L., *Oilfield-produced water as a medium for the growth of Chlorella pyrenoidosa outdoor in an arid region. Environ. Sci. Pollut. Res.* 2022, 87509-87518, the disclosure of which is incorporated herein by reference in its entirety). It has been documented that microalgae C. sorokiniana are capable of absorbing a greater amount of nitrate when exposed to reduced levels of salt (See: Liu, Y., Yildiz, I., 2018. *The effect of salinity concentration on algal biomass production and nutrient removal from municipal wastewater by Dunaliella salina. Int. J. Energy Res.* 2018, 42, 2997-3006, the disclosure of which is incorporated herein by reference in its entirety). Consequently, significant amounts of this nutrient were depleted from the supplemented HSB medium due to the growth of microalgae by the end of the culture period. Although the microalgae in the supplemented HSB medium may not eliminate the N, the residual N levels typically fall within the range of 4 to 6.5 mg/L. This can be deemed as a successful N absorption, in accordance with the European Commission Directive 98/15/EC, which sets a maximum limit of 10 mg/L for Total N discharge (See: Álvarez-Diaz, P. D., Ruiz, J., Arbib, Z., Barragán, J., Garrido-Pérez, M. C., Perales, J. A., *Freshwater microalgae selection for simultaneous wastewater nutrient removal and lipid production. Algal Res.* 2017, 24, 477-485, the disclosure of which is incorporated herein by reference in its entirety).

Figure 4B:
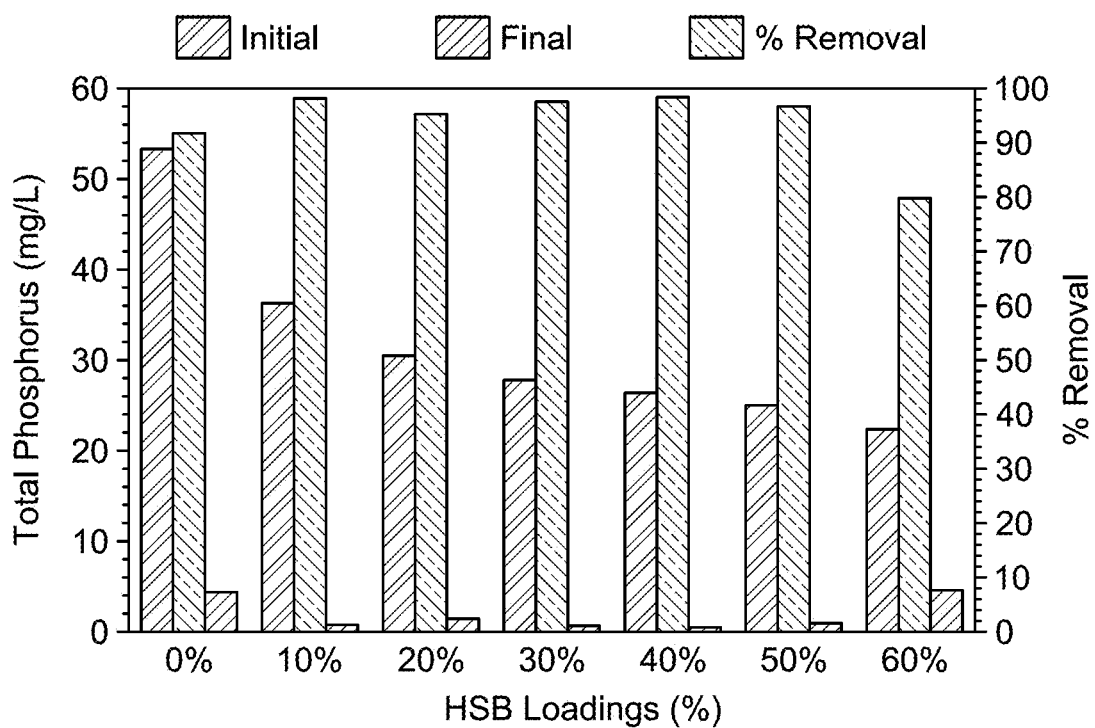
FIG. 4B shows initial and final concentration and percentage removal of total phosphorus (TP) in the culture medium under different oilfield hypersaline brine (HSB) loadings, according to certain embodiments.

FIG. 4B depicts the total phosphorus (TP) uptake by C. sorokiniana UTEX 1230 grown under varied levels of HSB loadings. As appeared in FIG. 4B, the photobioreactor containing 0%, 10%, 20%, 30%, 40%, 50%, and 60% HSB loadings showed that the initial average values for each dilution were 53.25 mg/L, 36.24 mg/L, 30.55 mg/L, 27.82 mg/L, 26.4 mg/L, 25 mg/L, and 22.3 mg/L respectively and were reduced to around 4.4 mg/L, 0.67 mg/L, 1.45 mg/L, 0.65 mg/L, 0.4 mg/L, 0.84 mg/L, and 4.5 mg/L after the end of cultivation, representing the average removal of 91.74%, 98.15%, 95.25%, 97.66%, 98.48%, 96.64%, and 79.82% of phosphorus correspondingly. It is noteworthy that the average percentage removal of phosphorus for all HSB loadings was higher than that of 0% HSB (control) except 60% HSB loading. The phosphorus removal obtained in this study for different HSB loadings is consistent with the findings of similar work done by other researchers. For example, Rahmani and researchers (2022) assessed the potential of *Chlorella pyrenoidosa* for oil field PW treatment and found the 57.14%, and 75.51% TN, and TP removal respectively throughout the cultivation period (See: Rahmani, A., Zerrouki, D., Tabchouche, A., Djafer, L., *Oilfield-produced water as a medium for the growth of Chlorella pyrenoidosa outdoor in an arid region. Environ. Sci. Pollut. Res.* 2022, 87509-87518, the disclosure of which is incorporated herein by reference in its entirety). In addition, Talebi and researchers (2016) guided a study on the use of microalgae culture in indoor photobioreactors for treating petroleum generated PW. The researchers discovered that microalgae had a remarkable capacity to eliminate nitrogen by 65% and phosphorus by 40% (See: Talebi, A. F., Dastgheib, S. M. M., Tirandaz, H., Ghafari, A., Alaie, E., Tabatabaei, M., *Enhanced algal-based treatment of petroleum produced water and biodiesel production. RSC Adv.* 2016, 6, 47001-47009, the disclosure of which is incorporated herein by reference in its entirety). The results obtained in FIG. 2 and FIG. 4B clearly indicate that the removal of phosphorus from the photobioreactors of HSB loadings medium is mostly influenced by the growth of microalgae as well as the imposition of salt stress compelled the microalgae to use the nutrients, even in the presence of an imbalanced ratio (See: Yang, Q., Zhang, M., Alwathnani, H. A., Usman, M., Mohamed, B. A., Abomohra, A. E. F., Salama, E. S., *Cultivation of Freshwater Microalgae in Wastewater Under High Salinity for Biomass, Nutrients Removal, and Fatty Acids Biodiesel Production. Waste and Biomass Valorization* 2022, 13, 3245-3254, the disclosure of which is incorporated herein by reference in its entirety). Phosphate can be adsorbed by the microalgal cell wall and then undergo phosphorylation (See: Faruque, M. O., Hossain, M. M., Farooq, W., Razzak, S. A., *Phototrophic Bioremediation of Municipal Tertiary Wastewater Coupling with Lipid Biosynthesis Using Scenedesmus dimorphus*: Effect of Nitrogen to Phosphorous Ratio with without CO$_2$ Supplementation. *Sustainability* 2023, 15, 1409, the disclosure of which is incorporated herein by reference in its entirety). Despite the imbalanced supplemental HSB (N/P) ratio in this investigation, C. sorokiniana UTEX 1230 demonstrated effective nitrogen absorption and successful phosphorus elimination. In summary, in contrast to N uptake, P was entirely devoured from all photobioreactors by C. sorokiniana, meeting Total P European Commission Directive 98/15/EC, (See: Álvarez-Diaz, P. D., Ruiz, J., Arbib, Z., Barragán, J., Garrido-Pérez, M. C., Perales, J. A., *Freshwater microalgae selection for* simultaneous wastewater nutrient removal and lipid production. *Algal Res.* 2017, 24, 477-485, the disclosure of which is incorporated herein by reference in its entirety) limits of 1 mg. L$^{-1}$ except 20% and 60% HSB loadings as an exception. It is noted that 60% HSB loadings comparatively showed the lower percentage of TN and TP removal, which may be caused by ions causing downregulation and blocking the transport system, which alters the microalgae's cellular structure by making it more salinized and preventing the uptake of nutrients (N and P) (See: Zafar, A. M., Javed, M. A., Aly Hassan, A., Mehmood, K., Sahle-Demessie, E., *Recent updates on ions and nutrients uptake by halotolerant freshwater and marine microalgae in conditions of high salinity. J. Water Process Eng.* 2021, 44, 102382, the disclosure of which is incorporated herein by reference in its entirety).

Figure 5:
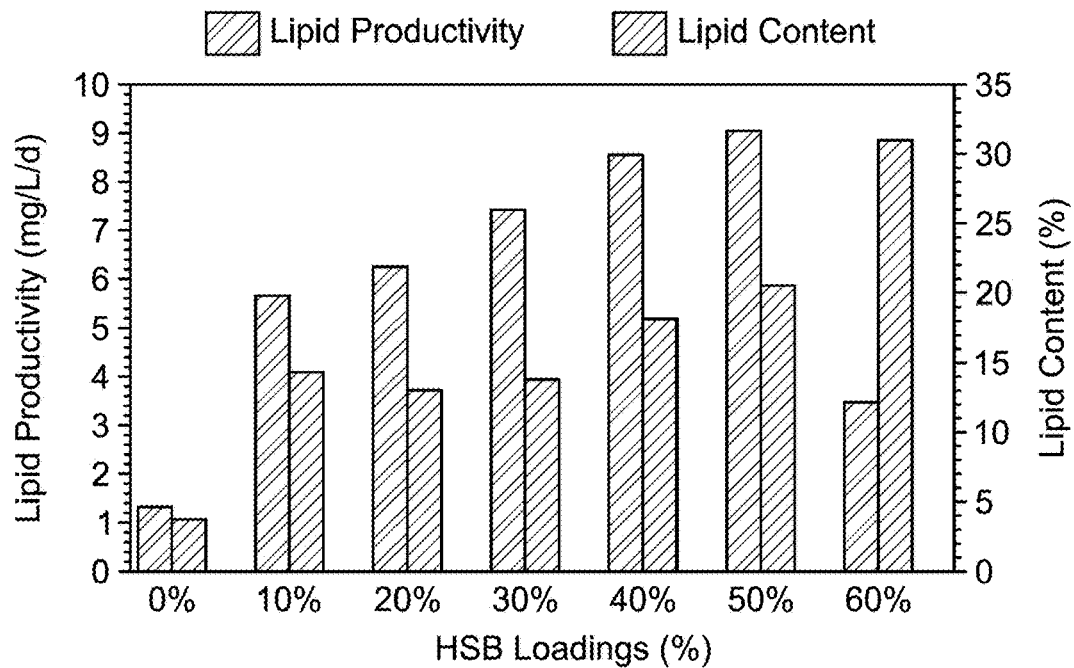
FIG. 5 shows lipid content and lipid productivity of *C. sorokiniana* UTEX 1230 measured for different HSB loadings at the end of cultivation period, according to certain embodiments.

The lipid content of *C. sorokiniana* UTEX 1230 cultured in seven distinct HSB loadings medium was measured at the end of corresponding cultivation period and is illustrated in FIG. 5. Briefly, the results indicate that culture medium compositions have an influence on lipid accumulation in microalgae biomass (See: Álvarez-Diaz, P. D., Ruiz, J., Arbib, Z., Barragán, J., Garrido-Perez, M. C., Perales, J. A., *Freshwater microalgae selection for simultaneous wastewater nutrient removal and lipid production. Algal Res.* 2017, 24, 477-485, the disclosure of which is incorporated herein by reference in its entirety). Considering all HSB loadings, the lipid content widely varied within the range of 3.7% to 30.94%. These obtained results of lipid content were close to the findings of other researchers (See: Lizzul, A. M., Lekuona-Amundarain, A., Purton, S., Campos, L. C., *Characterization of chlorella sorokiniana, UTEX* 1230. *Biology (Basel).* 2018, 7, 1-12, the disclosure of which is incorporated herein by reference in its entirety), where *C. sorokiniana* cultivated mixotrophically on waste dark fermentation effluents having acetate. As appeared in FIG. 5, lipid content increased steadily with an increase in HSB loadings up to 50% HSB loadings and then it experienced a boost for 60% HSB loadings. The increasing trend of lipid content with increasing HSB loadings indicates that salinity as well as nutrients in optimum level have an influence to accumulate lipid in *C. sorokiniana* UTEX 1230 biomass. These findings are corroborated with the similar findings of other reported work (See: Yang, Z., Chen, J., Tang, B., Lu, Y., Ho, S. H., Wang, Y., Chen, C., Shen, L., *Metabolic interpretation of NaCl stress-induced lipid accumulation in microalgae for promising biodiesel production with saline wastewater. Chem. Eng. Sci.* 2024, 284, 119447, the disclosure of which is incorporated herein by reference in its entirety). The highest lipid content of 30.94% of dry weight of biomass was acquired with 60% HSB loadings, whereas it was only 3.7% of dry weight of biomass link to the 0% HSB loadings. The highest lipid content with 60% HSB loadings may be due to the prevailing salinity stress. Because excessively high salinity levels can still stress the cells, diverting energy towards lipid production for cellular protection rather than biomass growth (See: Anand, V., Kashyap, M., Samadhiya, K., Ghosh, A., Kiran, B., *Salinity driven stress to enhance lipid production in Scenedesmus vacuolatus: A biodiesel trigger? Biomass and Bioenergy* 2019, 127, 105252, the disclosure of which is incorporated herein by reference in its entirety).

The lipid productivities of *C. sorokiniana* UTEX 1230 in seven different cultures were computed as depicted in FIG. 5. Lipid productivities ranged from 1.31 to 9.03 mg/L/d, according to the data. When 10% to 50% HSB loadings were considered, the lipid productivity of *C. sorokiniana* UTEX 1230 across various treatments was mostly caused by variations in their biomass, while the lipid contents of the species within those various treatments did not differ significantly. Microalgae *C. sorokiniana* UTEX 1230 cultured in 0% HSB loadings showed the lowest lipid productivities compared to other experiment groups associated with the lower lipid content in microalgal biomass. However, *C. sorokiniana* UTEX 1230 grown in 60% HSB loadings had significant lipid levels, but its biomass productivity was constrained, leading to comparatively low lipid productivity. This findings are corroborated with similar findings of other researcher (See: Zhu, L., Wang, Z., Shu, Q., Takala, J., Hiltunen, E., Feng, P., Yuan, Z., *Nutrient removal and biodiesel production by integration of freshwater algae cultivation with piggery wastewater treatment. Water Res.* 2013, 47, 4294-302, the disclosure of which is incorporated herein by reference in its entirety). Considering 50% of HSB loadings having lipid content of 20.45% dry weight of biomass revealed the highest lipid productivity link to the moderate level of biomass productivity. In summary, the findings of this study indicate that *C. sorokiniana* UTEX 1230 exhibits great potential for utilization in petroleum derived HSB due to its ability to thrive in challenging conditions, adapt to varying levels of salinity, effectively remediate pollutants, and generate valuable by-products.

Although the rapid SPV method was used to evaluate the total lipid amount of biomass at the end of the microalgae *C. sorokiniana* UTEX 1230 cultivation and the results were reported in the previous section, a deeper comprehension of the biochemical, chemical, physical, and HHV of the dried microalgae biomass is required to establish a suitable method to produce commercial biofuel. Therefore, to categorize microalgal species according to their applications, a comprehensive bio-composition analysis is needed. The objective of the subsequent section is to determine the bio-compounds (proteins, carbohydrates, and lipids) present in dried algal biomass through a successive method of FTIR/TGA/CHNS instrumental analysis. This is done to conduct a systematic characterization of the biomass.

Figure 6:
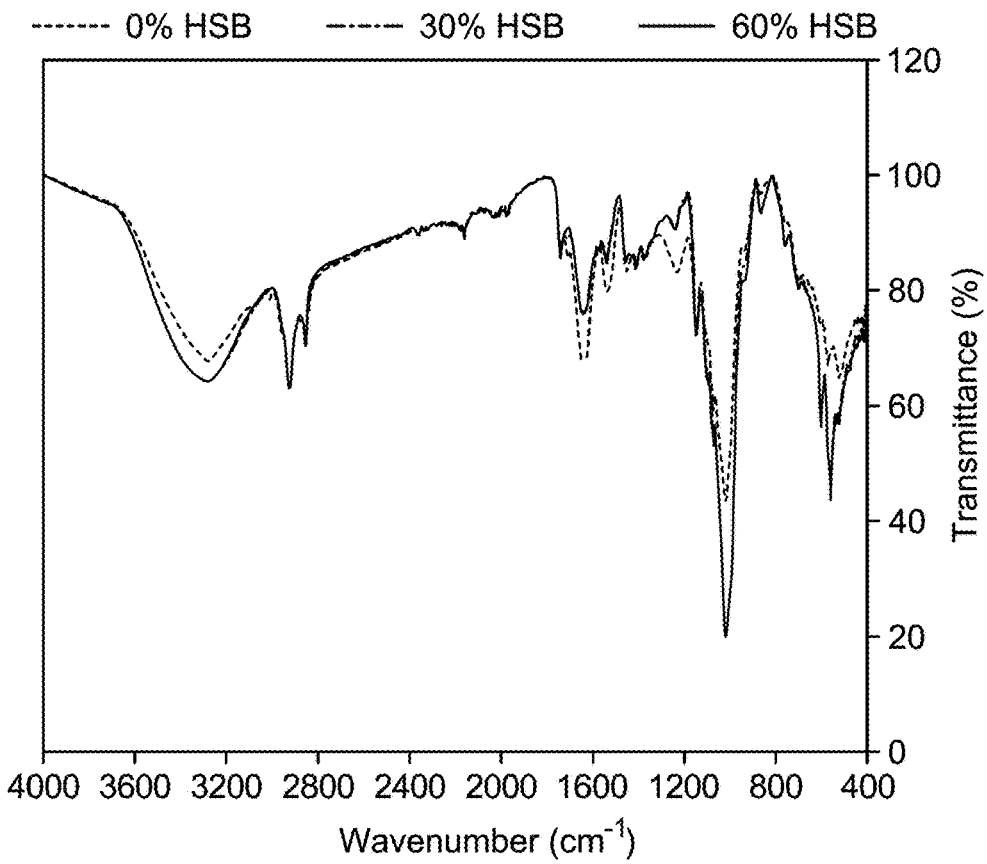
FIG. 6 shows the Fourier transform infrared (FTIR) spectra of *C. sorokiniana* UTEX 1230 biomass cultured with 0%, 30%, and 60% HSB loadings, according to certain embodiments.

By analyzing the entire FTIR spectrum, including peaks associated with various biomolecules (lipids, proteins, carbohydrates, etc.), it is possible to assess the overall composition of microalgae biomass obtained under different HSB loadings. The FTIR transmittance of the *C. sorokiniana* UTEX 1230 algal biomass indicates the occurrence of —COOH, —OH, —CO, and $NH_2$ organic chemical groups under different HSB loadings (0%, 30%, and 60%) corresponding to low, medium, and high salinity levels, as shown in FIG. 6 and Table 3. According to the obtained FTIR spectra, the *C. sorokiniana* UTEX 1230 biomass FTIR characterization has shown the shift in infrared (IR) peaks in some positions due to the different salinity level in the culture medium. As appeared in FIG. 6, the IR peaks from 0% HSB biomass such as 3283 cm$^{-1}$, 2933 cm$^{-1}$, 2853 cm$^{-1}$, 2365 cm$^{-1}$, were shifted to 3284 cm$^{-1}$, 2922 cm$^{-1}$, 2852 cm$^{-1}$, 2359 cm$^{-1}$, respectively associated with both 30% and 60% HSB biomass. Moreover, IR peak 2161 cm$^{-1}$ of 0% HSB biomass was shifted to 2164 cm$^{-1}$ (30% HSB biomass) and 2160 cm$^{-1}$ (60% HSB biomass). IR peak 1735 cm$^{-1}$ of 0% HSB biomass was shifted to 1742 cm$^{-1}$ for both 30% and 60% HSB biomass also. Similarly, shifting of other IR peaks of 0% HSB biomass was seen when compared to 30% and 60% HSB biomass. Changes in peak intensities, positions, and shapes can provide valuable information about the biochemical responses of microalgae to salinity stress (See: Tiquia-Arashiro, S., Li, X., Pokhrel, K., Kassem, A., Abbas, L., Coutinho, O., Kasperek, D., Najaf, H., Opara, S., *Applications of Fourier Transform-Infrared spectroscopy in microbial cell biology and environmental microbiology: advances, challenges, and future perspectives. Front. Microbiol.* 2023, 14, 1304081, the disclosure of which is incorporated herein by reference in its entirety). Cellular macromolecules (lipids, proteins, and carbohydrates) can be identified in various study locations based on their distinct transmission bands by analyzing the acquired FTIR spectra. Two sites are frequently used in the literature to determine the lipid content by FTIR: the vibrational stretching of ester bonds at 1742 cm$^{-1}$ and the methylene and methyl groups at 2800-3000 cm$^{-1}$ (See: Difusa, A., Mohanty, K., Goud, V. V., *The chemometric approach applied to FTIR spectral data for the analysis of lipid content in microalgae cultivated in different nitrogen sources. Biomass Convers. Biorefinery* 2016, 6, 427-433, the disclosure of which is incorporated herein by reference in its entirety). The presence of "lipid band spectra" linked with the symmetric stretching of methylene's C—H bonds is responsible for the FTIR bands observed at 2922 cm$^{-1}$ and 2852 cm$^{-1}$ for 30% and 60% HSB loadings respectively, as depicted in FIG. 6. These lipid-associated bands are stronger in comparison to similar findings by other studies (See: Sudhakar, K., Premalatha, M., *Characterization of micro algal biomass through FTIR TGA CHN analysis: Application to scenedesmus sp. Energy Sources, Part A Recover. Util. Environ. Eff.* 2015, 37, 2330-2337, the disclosure of which is incorporated herein by reference in its entirety). The band observed at 3284 cm$^{-1}$ (30% and 60% HSB loadings) and 3283 cm$^{-1}$ (0% HSB loadings) is a result of the stretching of the O—H bonds. The presence of a prominent peak at 1742 cm$^{-1}$ (30% and 60% HSB loadings) can be attributed to the stretching of C═O bonds in esters (inserted Table 3). This peak is believed to be mainly associated with lipid and fatty acid ester bonds (See: Movasaghi, Z., Rehman, S., Rehman, I. U., *Fourier transform infrared (FTIR) spectroscopy of biological tissues. Appl. Spectrosc. Rev.* 2008, 43, 134-179, the disclosure of which is incorporated herein by reference in its entirety). Another significant band observed at a wavenumber of 1646 cm$^{-1}$ is attributed to the stretching of the C—O bond in the amide I region, which is connected with proteins (See: Faruque, M. O., Hossain, M. M., Razzak, S. A., *Photoautotrophic Cultivation, Lipid Enhancement, and Dry Biomass Characterization of Microalgae Scenedesmus dimorphus for Bioenergy Application. Arab. J. Sci. Eng.* 2023, 48, 16263-16280, the disclosure of which is incorporated herein by reference in its entirety). The relative lipid content was determined by calculating the ratio of the intensity of the lipid band at 1742 cm$^{-1}$ to the intensity of the amide I band at 1646 cm$^{-1}$ (See: Meng, Y., Yao, C., Xue, S., Yang, H., *Application of fourier transform infrared (FT-IR) spectroscopy in determination of microalgal compositions. Bioresour. Technol.* 2014, 151, 347-354, the disclosure of which is incorporated herein by reference in its entirety). The ratio of the lipid: amide band was higher in the saline medium containing 30% and 60% HSB loadings compared to the medium with 0% HSB loadings. This indicates that HSB enhances the lipid content in microalgal biomass (See: Rahmani, A., Zerrouki, D., Tabchouche, A., Djafer, L., *Oilfield-produced water as a medium for the growth of Chlorella pyrenoidosa outdoor in an arid region. Environ. Sci. Pollut. Res.* 2022, 87509-87518, the disclosure of which is incorporated herein by reference in its entirety). The spectra of the amide II band, which mostly consists of stretching vibrations of C—H and N—H bonds associated with proteins, were observed at around 1541 cm$^{-1}$ (30% and 60% HSB loadings) and 1539 cm$^{-1}$ (0% HSB loadings). The spectra at 1455 cm$^{-1}$ (0% HSB loadings) and 1414 cm$^{-1}$ (30% and 60% HSB loadings) correspond to the bending of methyl groups ($CH_2$ and $CH_3$) and the stretching of carboxylic groups (C—O) associated with the presence of proteins in *C. sorokiniana* UTEX 1230 biomass (inserted Table 3). Due to the asymmetric stretching of the phosphodiester P═O, the protein band spectra exhibited a moderately significant band at around 1238 cm$^{-1}$. The 'carbohydrate band spectra' exhibited strong and medium features in the range of approximately 1149-522 cm$^{-1}$ due to C—O—C and C—O stretching. The presence of the main constituents of the *C. sorokiniana* UTEX 1230 species, specifically lipid, carbohydrate, and protein, was detected by the spectral bands. These outcomes are consistent with several others (Faruque, M. O., Hossain, M. M., Razzak, S. A., *Photoautotrophic Cultivation, Lipid Enhancement, and Dry Biomass Characterization of Microalgae Scenedesmus dimorphus for Bioenergy Application. Arab. J. Sci. Eng.* 2023, 48, 16263-16280, the disclosure of which is incorporated herein by reference in its entirety; Sudhakar, K., Premalatha, M., *Characterization of micro algal biomass through FTIR/TGA/CHN analysis: Application to scenedesmus sp. Energy Sources, Part A Recover. Util. Environ. Eff.* 2015, 37, 2330-2337, the disclosure of which is incorporated herein by reference in its entirety).

TABLE 3

Interpretation of the associated functional groups and corresponding biomolecules obtained in biomass.

| Wave number (cm$^{-1}$) | Band assignment | Comments |
| --- | --- | --- |
| 3512-3003 | Water, (O—H) stretching; Protein, (N—H) stretching (amide A) | Water, protein |
| 2940-2897 | (C—H) from methylene groups of lipids | Primary lipids |
| 2860-2835 | (C—H) from methylene groups of lipids | Primary lipids |
| 1811-1720 | (C═O) stretching of esters | Esters of lipids and fatty acids |
| 1692-1599 | Amide I band mainly (C═O) stretching | Protein (Amide I) |
| 1545-1460 | Amide II band mainly (C—H) and (N—H) associated with protein | Protein (Amide II) |
| 1455-1416 | ($CH_2$) and ($CH_3$) bending of methyl | Proteins |
| 1398-1350 | ($CH_3$) and ($CH_2$) of proteins, and C—O of COO$^-$ group | Proteins and carboxylic acids |
| 1312-1204 | (P═O) of phosphodiester groups | Nucleic acids (DNA and RNA) |
| 1200-900 | (C—O—C) of polysaccharides | Carbohydrates |
| 1020-957 | (C—O) stretching, (C—O—C) of polysaccharides | Carbohydrates |
| 880-570 | Polysaccharides of cell wall | — |

TGA plays a pivotal role in assessing the bioenergy potential of microalgae biomass, offering valuable insights into its thermal behavior and decomposition characteristics. This analytical technique helps in understanding the intricate interplay between temperature, biomass composition, and energy release, laying the foundation for informed decisions in bioenergy research and development. TGA can be used to measure the proximate composition of biomass samples, including moisture content (MC), volatile matter (VM), ash content, and fixed carbon (FC). In this study, TGA analysis has detected three stages of degradation of microalgae biomass, similar to what other authors have shown (See: Arora Soni, R., Sudhakar, K., S. Rana, R., *Biochemical and*

Figure 7:
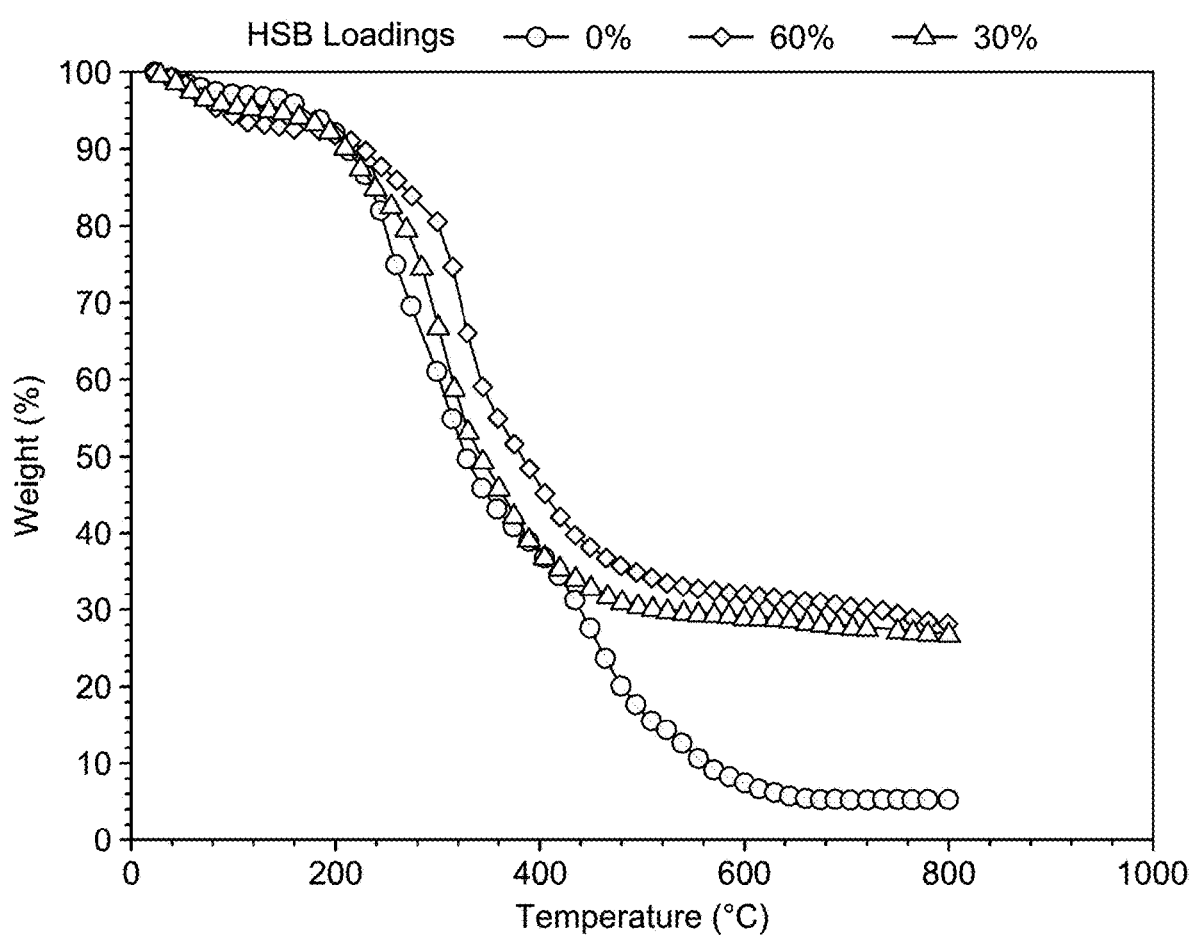
FIG. 7 shows a plot for the thermogravimetric analysis (TGA) of *C. sorokiniana* UTEX 1230 biomass cultured with 0%, 30%, and 60% HSB loadings, according to certain embodiments.

*Thermal Analysis of Spirulina Biomass through FTIR, TGA, CHN. Energy Eng.* 2021, 118, 1045-1056, the disclosure of which is incorporated herein by reference in its entirety). It was noticed that samples cultured in different HSB loadings have similar thermal characteristics except for a few differences in 0% HSB loadings. The TGA analysis of the pyrolytic characteristics of *C. sorokiniana* biomass in microalgae grown in low salinity conditions (0% HSB loadings), moderate salinity conditions (30% HSB loadings), and high salinity conditions (60 HSB loadings) are presented in FIG. 7. The predominant source of the initial stage of mass loss, which includes the loss of free water and water loosely bound to biomolecules before 160° C. (0% HSB biomass), 180° C. (30% HSB biomass), and 185° C. (60% HSB biomass), was the moisture content (MC) of the microalgae biomass sample, as shown in FIG. 7 (See: Marcilla, A., Gómez-Siurana, A., Gomis, C., Chápuli, E., Catalá, M. C., Valdés, F. J., *Characterization of microalgal species through TGA/FTIR analysis: Application to nannochloropsis sp. Thermochim. Acta* 2009, 484, 41-47, the disclosure of which is incorporated herein by reference in its entirety). It is seen that *C. sorokiniana* biomass had a moisture level in the range of 4.18% to 8.05% considering all HSB loadings in this study, as shown in Table 4, suggesting it a suitable option for direct combustion. Due to the endothermic nature of evaporation, a combustible material utilized in thermochemical systems requires a low moisture content (less than 10%) in order to enhance the amount of usable energy (See: Garcia, R., Pizarro, C., Lavin, A. G., Bueno, J. L., *Spanish biofuels heating value estimation. Part II: Proximate analysis data. Fuel* 2014, 117, 1139-1147, the disclosure of which is incorporated herein by reference in its entirety.). According to Table 4, it is seen that salinity in culture medium had an influence on moisture content in biomass and almost revealed a positive correlation: salinity can affect water uptake and retention in cells, potentially leading to variations in moisture content.

During the devolatilization stage, the *C. sorokiniana* biomass underwent vaporization of its main organic constituents within specific temperature ranges. For biomass with 0% HSB, this vaporization occurred between 185° C. and 510° C. For biomass with 30% and 60% HSB loadings, the vaporization took place in the temperature range of 195° C. to 435° C. and 190° C. to 385° C. respectively. These vaporization were a result of the thermal breakdown of proteins, carbohydrates, and lipids (See: Arif, M., Li, Y., El-Dalatony, M. M., Zhang, C., Li, X., Salama, E. S., *A complete characterization of microalgal biomass through FTIR TGA CHNS analysis: An approach for biofuel generation and nutrients removal. Renew. Energy.* 2021, 163, 1973-1982, the disclosure of which is incorporated herein by reference in its entirety). The volatile matter content of *C. sorokiniana* biomass was in the range of 47.81% to 80.31% considering all HSB loadings, as shown in Table 4. More particularly, the volatile matter content was 80.31%, 59.51%, and 49.71% for 0%, 30% and 60% HSB loadings biomass respectively. The variation in obtained volatile matter content in microalgal biomass may be due to the incremental salinity level at different HSB loadings. Because salinity influences the cellular metabolism of microalgae. High salinity levels can stress microalgae, alter their metabolic pathways and affecting the accumulation of lipid, protein, and carbohydrate in microalgal biomass, which in turn affect the volatile matter content. The percentage of volatile matter achieved in this study is consistent with the similar findings of other researcher (See: Chen, C., Ma, X., Liu, K., Thermogravimetric analysis of microalgae combustion under different oxygen supply concentrations. Appl. Energy 2011, 88, 3189-3196, the disclosure of which is incorporated herein by reference in its entirety; Sukarni, Sudjito, Hamidi, N., Yanuhar, U., Wardana, I. N. G., *Potential and properties of marine microalgae Nannochloropsis oculata as biomass fuel feedstock. Int. J. Energy Environ. Eng.* 2014, 5, 279-290, the disclosure of which is incorporated herein by reference in its entirety).

As appeared in FIG. 7, the left over mass loss in the third stage after 510° C. to until 800° C. (0% HSB biomass), after 435° C. to until 800° C. (30% HSB biomass) and after 385° C. to until 800° C. (60% HSB biomass) was due to both ash content and fixed carbon (FC) (See: Bi, Z., He, B. B., *Characterization of microalgae for the purpose of biofuel production. Trans. ASABE.* 2013, 56, 1529-1539, the disclosure of which is incorporated herein by reference in its entirety). According to the reports expressed in Table 4, the percentage of fixed carbon and ash content in biomass were in the range of 6.19% to 17.06% and 5.31% to 32.80% respectively considering all HSB loadings in this study. It is evident that biomass obtained from higher HSB loadings has the higher ash content than that of 0% HSB loadings. Because high salinity levels may lead to the accumulation of salts within the biomass, affecting the combustion behavior and ash content during TGA analysis. In general, *C. sorokiniana* biomass burns more quickly during the devolatilization phase because to its high volatile matter and low fixed carbon contents (See: Sukarni, Sudjito, Hamidi, N., Yanuhar, U., Wardana, I. N. G., *Potential and properties of marine microalgae Nannochloropsis oculata as biomass fuel feedstock. Int. J. Energy Environ. Eng.* 2014, 5, 279-290, the disclosure of which is incorporated herein by reference in its entirety). The study's proximate analysis, together with comparable data from other sources are presented in Table 4.

TABLE 4

Proximate analysis of *C. sorokiniana* biomass in different HSB loadings compared with similar findings reported previously.

| Microalgae biomass | Moisture content (MC) (% dry wt.) | Volatile matter (VM) (% dry wt.) | Fixed carbon (FC) (% dry wt.) | Ash content (% dry wt.) | Reference |
|---|---|---|---|---|---|
| *Chlorella vulgaris* | 9.10 | 37.3 | 5.0 | 48.6 | [4.1] |
| *Spirulina* sp. | 6.50 | 59.5 | 15.5 | 18.5 | [4.2] |
| *Scenedesmus* sp. | 5.72 | 67.94 | 6.8 | 19.64 | [4.3] |
| *Nannochloropsis oculata* | 3.99 | 67.45 | 8.08 | 24.47 | [4.4] |

TABLE 4-continued

Proximate analysis of C. sorokiniana biomass in different HSB loadings compared with similar findings reported previously.

| Microalgae biomass | Moisture content (MC) (% dry wt.) | Volatile matter (VM) (% dry wt.) | Fixed carbon (FC) (% dry wt.) | Ash content (% dry wt.) | Reference |
|---|---|---|---|---|---|
| *Tetraselmis suecica* | 4.27 | 58.31 | 15.77 | 21.65 | [4.5] |
| *Scenedesmus almeriensis* | 2.90 | 67.90 | 9.70 | 19.40 | [4.6] |
| *Scenedesmus dimorphus* | 3.6 | 62.79 | 6.51 | 27.1 | [4.7] |
| *Chlorella sorokiniana* (0 % HSB or SMW) | 4.18 | 80.31 | 10.2 | 5.31 | This study |
| *Chlorella sorokiniana* (10 % HSB) | 6.75 | 48.88 | 13.95 | 30.42 | This study |
| *Chlorella sorokiniana* (20 % HSB) | 6.71 | 54.3 | 6.19 | 32.80 | This study |
| *Chlorella sorokiniana* (30 % HSB) | 6.31 | 59.51 | 7.17 | 27.01 | This study |
| *Chlorella sorokiniana* (40 % HSB) | 6.66 | 47.81 | 15.47 | 30.06 | This study |
| *Chlorella sorokiniana* (50 % HSB) | 7.75 | 49.11 | 17.06 | 26.08 | This study |
| *Chlorella sorokiniana* (60 % HSB) | 8.05 | 49.71 | 13.99 | 28.25 | This study |

Table 4 includes following references:

[4.1] Agrawal, A., Chakraborty, S., *A kinetic study of pyrolysis and combustion of microalgae Chlorella vulgaris using thermo-gravimetric analysis. Bioresour. Technol.* 2013, 128, 72-80, the disclosure of which is incorporated herein by reference in its entirety.

[4.2] Arora Soni, R., Sudhakar, K., S. Rana, R., *Biochemical and Thermal Analysis of Spirulina Biomass through FTIR, TGA, CHN. Energy Eng.* 2021, 118, 1045-1056, the disclosure of which is incorporated herein by reference in its entirety.

[4.3] Sudhakar, K., Premalatha, M., 2015. *Characterization of micro algal biomass through FTIR/TGA/CHN analysis: Application to scenedesmus sp. Energy Sources, Part A Recover. Util. Environ. Eff.* 2015, 37, 2330-2337, the disclosure of which is incorporated herein by reference in its entirety.

[4.4] Sukarni, Sudjito, Hamidi, N., Yanuhar, U., Wardana, I. N. G., *Potential and properties of marine microalgae Nannochloropsis oculata as biomass fuel feedstock. Int. J. Energy Environ. Eng.* 2014, 5, 279-290, the disclosure of which is incorporated herein by reference in its entirety.

[4.5] Tahmasebi, A., Kassim, M. A., Yu, J., Bhattacharya, S., 2013. *Thermogravimetric study of the combustion of Tetraselmis suecica microalgae and its blend with a Victorian brown coal in $O_2/N_2$ and $O_2/CO_2$ atmospheres. Bioresour. Technol.* 2013, 150, 15-27, the disclosure of which is incorporated herein by reference in its entirety.

[4.6] López-González, D., Fernandez-Lopez, M., Valverde, J. L., Sanchez-Silva, L., *Pyrolysis of three different types of microalgae: Kinetic and evolved gas analysis. Energy.* 2014, 73, 33-43, the disclosure of which is incorporated herein by reference in its entirety.

[4.7] Faruque, M. O., Hossain, M. M., Razzak, S. A., *Photoautotrophic Cultivation, Lipid Enhancement, and Dry Biomass Characterization of Microalgae Scenedesmus dimorphus for Bioenergy Application. Arab. J. Sci. Eng.* 2023, 48, 16263-16280, the disclosure of which is incorporated herein by reference in its entirety.

CHNS analysis provides insights into the elemental composition of microalgae biomass, specifically carbon (C), hydrogen (H), nitrogen (N), and sulfur(S). These elements are fundamental in determining the energy content and combustion properties of biomass. Ultimate analysis is another word for the elemental determination of hydrogen, carbon, sulfur, and nitrogen. Before proceeding with additional processing, it is necessary to do an ultimate analysis on a sample of microalgae biomass in order to examine the beneficial benefits of microalgae as a feedstock for biofuel (See: Suárez-Garcia, F., Martinez-Alonso, A., Fernández Llorente, M., Tascón, J. M. D., *Inorganic matter characterization in vegetable biomass feedstocks. Fuel.* 2002, 81, 1161-1169, the disclosure of which is incorporated herein by reference in its entirety.). As indicated in Table 5, the C, H, N, and S contents of the *C. sorokiniana* algal biomass were measured at various HSB loadings. The outcomes were compared to related observations from other published studies. The elemental composition of 0% HSB biomass was found different as compared to others, representing highest carbon content (49%) in biomass than those of others considering all HSB loadings. It is true that salinity had a direct effect on carbon content in biomass. Considering all HSB loadings, relatively reduced amount of carbon content was achieved, ranged from 36.12% to 40.27% with increasing salinity. Because high salinity can lead to cellular changes such as increased production of osmolytes (compounds that help maintain osmotic balance), which may indirectly affect carbon metabolism and storage. It is seen that sulfur content in biomass decreased with increase in salinity in the culture medium. Even though, zero sulfur content was measured for the biomass obtained from 20% to 60% HSB loadings. High carbon and hydrogen content relative to nitrogen and sulfur is desirable for efficient biofuel production (See: Paniagua, S., Calvo, L. F., Escapa, C., Coimbra, R. N., Otero, M., Garcia, A. I., *Chlorella sorokiniana thermogravimetric analysis and combustion characteristic indexes estimation. J. Therm. Anal. calorim.* 2018, 131, 3139-3149, the disclosure of which is incorporated herein by reference in its entirety) and are in good accord with the obtained outcome in this study.

Protein in microalgae biomass is a valuable resource with diverse applications. Microalgae are rich sources of high-quality protein, encompassing essential amino acids vital for human and animal health.

As reported in Table 5, protein content of *C. sorokiniana* was relatively higher in 0% HSB with 28.12% of dry weight. Total protein content for other HSB loadings ranged from 15.37% to 19.81%, showing a small inclination to decrease as salinity increases. Comparatively, higher protein content with 0% HSB may be due to the nitrogen rich condition of the culture medium. In their study, Mtaki and researchers (2021) found that increasing the nitrogen content in the growth medium can stimulate protein synthesis in microalgae (See: Mtaki, K., Kyewalyanga, M. S., Mtolera, M. S. P., *Supplementing wastewater with NPK fertilizer as a cheap source of nutrients in cultivating live food (Chlorella vulgaris). Ann. Microbiol.* 2021, 71, 7, the disclosure of which is incorporated herein by reference in its entirety). Haris and researchers (2022) claim that salinity instability may cause microalgae to produce less total protein content. Elevated levels of salt may limit the activation of ATP-synthase, hence inhibiting the synthesis of proteins. This may help to explain why *C. vulgaris*'s protein content decreases as salinity rises (See: Haris, N., Manan, H., Jusoh, M., Khatoon, H., Katayama, T., Kasan, N. A., *Effect of different salinity on the growth performance and proximate composition of isolated indigenous microalgae species. Aquac. Reports* 2022, 22, 100925, the disclosure of which is incorporated herein by reference in its entirety).

Carbohydrate is a significant constituent of *C. sorokiniana* biomass, and its synthesis can be influenced by variations in growth conditions, such as the properties of the nutritional media, including the levels of nitrogen, phosphates, and other micronutrients. In this study, the carbohydrate content of *C. sorokiniana* varied between 25% and 62.87% of the dry weight of biomass, surpassing the values reported in some existing literature (See: Kumar, K., Dasgupta, C. N., Das, D., 2014. *Cell growth kinetics of Chlorella sorokiniana and nutritional values of its biomass. Bioresour. Technol.* 2014, 167, 358-366, the disclosure of which is incorporated herein by reference in its entirety). Carbohydrate content was comparatively higher in 0% HSB and 30% HSB with 62.87% and 43.87% of dry weight of biomass respectively. It is seen that carbohydrate content in all HSB loadings except 60% HSB, as shown in Table 5, was higher as compared to total lipid content obtained in this study, shown in FIG. 5. According to Simas-Rodrigues and researchers (2015), *Chlorella* and *Tetraselmis* are microalgae genera that have a high carbohydrate content and are well-suited for bioethanol synthesis (See: Simas-Rodrigues, C., Villela, H. D. M., Martins, A. P., Marques, L. G., Colepicolo, P., Tonon, A. P., *Microalgae for economic applications: Advantages and perspectives for bioethanol. J. Exp. Bot.* 2015, 66, 4097-4108, the disclosure of which is incorporated herein by reference in its entirety). Because the synthetic pathway is tightly related, competitions arise in the generation of lipid and carbohydrate content in microalgae under stress conditions (See: Ho, S. H., Chen, C. Y., Chang, J. S., *Effect of light intensity and nitrogen starvation on $CO_2$ fixation and lipid carbohydrate production of an indigenous microalga Scenedesmus obliquus CNW-N. Bioresour. Technol.* 2012, 113, 244-252, the disclosure of which is incorporated herein by reference in its entirety). This statement likely elucidates the findings of the current study about the carbohydrate composition of *C. sorokiniana*, which exhibited a lower lipid content when compared to its carbohydrate content. During nutrient limitation in the stationary phase, which is the phase characterized by growth conditions that are restricted, the majority of carbon is typically transformed into carbohydrate content (See: Haris, N., Manan, H., Jusoh, M., Khatoon, H., Katayama, T., Kasan, N. A., *Effect of different salinity on the growth performance and proximate composition of isolated indigenous microalgae species. Aquac. Reports* 2022, 22, 100925, the disclosure of which is incorporated herein by reference in its entirety).

The HHV of microalgae biomass is a crucial parameter in determining its bioenergy potential. HHV represents the maximum amount of heat released when a fuel is completely combusted in an environment where the products are allowed to return to their original temperature, typically expressed in units of energy per unit mass (e.g., MJ/kg or kcal/kg). Table 5 also presents a comparison of the higher heating value of *C. sorokiniana* biomass with similar studies conducted in the past. As reported in Table 5, the HHV of *C. sorokiniana* biomass in the present study ranged from 16.15 MJ/kg to 22.84 MJ/kg, which is like the other works for different species including *C. sorokiniana* reported in the literature (See: Arif, M., Li, Y., El-Dalatony, M. M., Zhang, C., Li, X., Salama, E. S., *A complete characterization of microalgal biomass through FTIR/TGA/CHNS analysis: An approach for biofuel generation and nutrients removal. Renew. Energy.* 2021, 163, 1973-1982, the disclosure of which is incorporated herein by reference in its entirety). Maximum amount of HHV (22.84 MJ/kg) was achieved in this study for microalgae culturing with 10% HSB loadings. It may be due to the presence of relatively higher carbon as well as lower oxygen content in 10% HSB loadings biomass. The study found that *C. sorokiniana* had a higher HHV compared to lignocellulosic biomass sources like rice husks (16.7 MJ/kg), corn stalks (15.81 MJ/kg) (See: Yu, Y., Yang, Y., Cheng, Z., Blanco, P. H., Liu, R., Bridgwater, A. V., Cai, J., *Pyrolysis of Rice Husk and Corn Stalk in Auger Reactor. 1. Characterization of Char and Gas at Various Temperatures. Energy and Fuels* 2016, 30, 10568-10574, the disclosure of which is incorporated herein by reference in its entirety), bagasse sugarcane (16.4 MJ/kg) (See: Boumanchar, I., Chhiti, Y., M'hamdi Alaoui, F. E., El Ouinani, A., Sahibed-Dine, A., Bentiss, F., Jama, C., Bensitel, M., *Effect of materials mixture on the higher heating value: Case of biomass, biochar and municipal solid waste. Waste Manag.* 2017, 61, 78-86, the disclosure of which is incorporated herein by reference in its entirety) and pistachio shells (17.47 MJ/kg) (See: da Silva, J. C. G., Alves, J. L. F., Galdino, W. V. de A., Moreira, R. de F. P. M., José, H. J., de Sena, R. F., Andersen, S. L. F., 2018. *Combustion of pistachio shell: physicochemical characterization and evaluation of kinetic parameters. Environ. Sci. Pollut. Res.* 2018, 25, 21420-21429, the disclosure of which is incorporated herein by reference in its entirety).

TABLE 5

Ultimate analysis, protein, carbohydrate and HHV of C. sorokiniana biomass in different HSB loadings compared with similar findings of previously reported

| Microalgae biomass | C (% dry wt.) | H (% dry wt.) | N (% dry wt.) | S (% dry wt.) | O (% dry wt., by difference) | Protein (% dry wt.) | Carbohydrate (% dry wt.) | HHV (MJ/Kg) | Ref. |
|---|---|---|---|---|---|---|---|---|---|
| Chlorella sorokiniana | 49.74 | 7.60 | 8.25 | 0.38 | 34.03 | 37.7 | 27.51 | 20.96 | [5.1] |
| Chlorella sp. | 46.10 | 6.10 | 6.70 | 0.62 | 39.1 | 29.6 | 16.5 | 17.30 | [5.2] |
| Spirulina platensis | 51.81 | 7.11 | 3.95 | 1.27 | 32.90 | 65.64 | 7.20 | 20.97 | [5.3] |
| Nannochloris oculuta | 43.88 | 6.95 | 5.74 | 1.32 | 42.11 | n/a | n/a | 17.25 | [5.4] |
| Tetraselmis suecica | 27.72 | 4.59 | 4.70 | 1.11 | 40.23 | 29.37 | n/a | 9.38 | [5.5] |
| Scenedesmus almeriensis | 41.90 | 6.70 | 5.90 | 0.80 | 44.70 | 44.2 | 25.2 | 15.76 | [5.6] |
| Scenedesmus sp. | 24.45 | 7.68 | 5.42 | n/a | 22.45 | n/a | n/a | 15.20 | [5.7] |
| Scenedesmus dimorphus | 44.59 | 8.28 | 4.02 | 0.16 | 15.85 | 51.75 | n/a | 24.04 | [5.8] |
| Chlorella sorokiniana (0% HSB or SMW) | 49 | 8 | 4.5 | 0.51 | 32.68 | 28.12 | 62.87 | 22.14 | This study |
| Chlorella sorokiniana (10% HSB) | 39.56 | 8.88 | 3.17 | 0.17 | 17.8 | 19.81 | 35.46 | 22.84 | This study |
| Chlorella sorokiniana (20% HSB) | 36.12 | 6.97 | 2.59 | 0 | 21.52 | 16.18 | 38.02 | 18.30 | This study |
| Chlorella sorokiniana (30% HSB) | 40.20 | 6.67 | 2.46 | 0 | 23.66 | 15.37 | 43.87 | 18.87 | This study |
| Chlorella sorokiniana (40% HSB) | 38.72 | 5.87 | 3.03 | 0 | 22.32 | 18.93 | 32.91 | 17.47 | This study |
| Chlorella sorokiniana (50% HSB) | 38.40 | 5.64 | 2.57 | 0 | 27.31 | 16.06 | 37.41 | 16.15 | This study |
| Chlorella sorokiniana (60% HSB) | 40.27 | 6.35 | 2.53 | 0 | 22.6 | 15.81 | 25 | 18.64 | This study |

C: Carbon;
H: Hydrogen;
N: Nitrogen;
S: Sulphur;
O: Oxygen

Table 5 includes following references:

[5.1] Kumar, K., Dasgupta, C. N., Das, D., *Cell growth kinetics of Chlorella sorokiniana and nutritional values of its biomass.* Bioresour. Technol. 2014, 167, 358-366, the disclosure of which is incorporated herein by reference in its entirety.

[5.2] Rizzo, A. M., Prussi, M., Bettucci, L., Libelli, I. M., Chiaramonti, D., *Characterization of microalga Chlorella as a fuel and its thermogravimetric behavior.* Appl. Energy. 2013, 102, 24-31, the disclosure of which is incorporated herein by reference in its entirety.

[5.3] Sukarni, Sudjito, Hamidi, N., Yanuhar, U., Wardana, I. N. G., *Potential and properties of marine microalgae Nannochloropsis oculata as biomass fuel feedstock.* Int. J. Energy Environ. Eng. 2014, 5, 279-290, the disclosure of which is incorporated herein by reference in its entirety.

[5.4] Ye, B., Zhang, R., Cao, J., Lei, K., Liu, D., *The study of co-combustion characteristics of coal and microalgae by single particle combustion and TGA methods.* J. Energy Inst. 2020, 93, 508-517, the disclosure of which is incorporated herein by reference in its entirety.

[5.5] Tahmasebi, A., Kassim, M. A., Yu, J., Bhattacharya, S., 2013. *Thermogravimetric study of the combustion of Tetraselmis suecica microalgae and its blend with a Victorian brown coal in $O_2/N2$ and $O_2/CO_2$ atmospheres.* Bioresour. Technol. 2013, 150, 15-27, the disclosure of which is incorporated herein by reference in its entirety.

[5.6] López-González, D., Fernandez-Lopez, M., Valverde, J. L., Sanchez-Silva, L., *Pyrolysis of three different types of microalgae: Kinetic and evolved gas analysis.* Energy. 2014, 73, 33-43, the disclosure of which is incorporated herein by reference in its entirety.

[5.7] Sudhakar, K., Premalatha, M., 2015. *Characterization of micro algal biomass through FTIR TGA CHN analysis: Application to scenedesmus sp.* Energy Sources, Part A Recover. Util. Environ. Eff. 2015, 37, 2330-2337, the disclosure of which is incorporated herein by reference in its entirety.

[5.8] Faruque, M. O., Hossain, M. M., Razzak, S. A., *Photoautotrophic Cultivation, Lipid Enhancement, and Dry Biomass Characterization of Microalgae Scenedesmus dimorphus for Bioenergy Application. Arab. J. Sci. Eng.* 2023, 48, 16263-16280, the disclosure of which is incorporated herein by reference in its entirety.

Based on the findings shown in Table 5 of this investigation, the microalgal biomass samples that have a high calorific value are characterized by low nitrogen levels and almost little sulfur. Microalgal biomass possesses a diminished nitrogen and sulfur composition, rendering it a favorable option for the production of environmentally sustainable biofuels (Bi and He, 2013). In addition, solid fuels commonly utilized in bioenergy production, such as wood sawdust with a HHV of 18 to 19 MJ/kg, can be used as a reference to assess the energy potential of *C. sorokiniana* in thermal conversion processes (See: Alves, J. L. F., Da Silva, J. C. G., Costa, R. L., Dos Santos Junior, S. F., da Silva Filho, V. F., Moreira, R. D. F. P. M., José, H. J., *Investigation of the bioenergy potential of microalgae Scenedesmus acuminatus by physicochemical characterization and kinetic analysis of pyrolysis. J. Therm. Anal. calorim.* 2019, 135, 3269-3280, the disclosure of which is incorporated herein by reference in its entirety). Largely, the HHV of microalgae biomass serves as a key parameter in evaluating its potential as a sustainable source of bioenergy and guiding decision-making processes in the development and implementation of bioenergy technologies.

These findings demonstrate the feasibility and effectiveness of cultivating *C. sorokiniana* in synthetic oilfield HSB supplemented with SMW as a nutrient source. Through progressive adaptation in different HSB loadings, *C. sorokiniana* exhibited a better growth pattern and showed maximum biomass productivity (53.9 mg/L/d) with 30% HSB loadings. However, cultivation with higher HSB loadings could limit the growth of *C. sorokiniana*. At the end of cultivation, average nitrogen removal was in range of 53.57% to 89.1% considering all HSB loadings. In comparison to nitrogen uptake, phosphorus uptake was higher by *C. sorokiniana*, representing 79.82% to 98.48% phosphorus removal thinking of all HSB loadings. The suitability of *C. sorokiniana* biomass as a biofuel feedstock was determined by analyzing its physicochemical parameters, including proximate analysis, ultimate analysis, and determining HHV. *C. sorokiniana* biomass under different HSB loadings exhibited desirable biochemical composition, including higher carbohydrate content compared to protein and lipid, indicating its suitability for various biotechnological applications beyond biofuel production. To conclude, the ability of *C. sorokiniana* to adapt to extreme salinity conditions underscores its resilience and adaptability, making it well-suited for future cultivation in real produced water with the aim of bioremediation along with value added biomass production.

Numerous modifications and variations of the present disclosure are possible in light of the above teachings. It is therefore to be understood that within the scope of the appended claims, the invention may be practiced otherwise than as specifically described herein.

The invention claimed is:

1. A method of cultivating algal biomass using oilfield hypersaline brine (HSB), the method including:
   (a) admixing the oilfield HSB with a first aqueous composition including a source of nitrogen and a source of phosphorous to form an aqueous medium having a total salinity of from about 0.1 to about 40 grams per liter (g/L);
   (b) inoculating the aqueous medium with an algal culture including *Chlorella sorokiniana* UTEX 1230 to form an aqueous growth medium; and,
   (c) after a first duration of time, collecting algal biomass from the aqueous growth medium;
   wherein the *Chlorella sorokiniana* UTEX 1230 of the algal culture is obtained by subjecting the *Chlorella sorokiniana* UTEX 1230 to n media having serially increased salinity in the range from about 0.1 to about 40 g/L;
   further wherein: n is from 5 to 10;
   the first medium of the series has a salinity of from about 0.1 to about 10 g/L;
   the $n^{th}$ medium of the series has a salinity of from about 30 to about 40 g/L; and
   the *Chlorella sorokiniana* UTEX 1230 is isolated from each medium of the series.

2. The method according to claim 1, wherein the aqueous growth medium has a pH of from about 5 to about 7.

3. The method according to claim 1, wherein the aqueous growth medium has a total dissolved solids content of from about 0.5 to about 30 g/L.

4. The method according to claim 1, wherein the aqueous growth medium has a total nitrogen (TN) content of from about 10 to about 50 mg/L.

5. The method according to claim 1, wherein the aqueous growth medium has a total phosphorous (TP) content of from about 20 to about 60 mg/L.

6. The method according to claim 1, wherein:
   the admixed first aqueous composition includes municipal wastewater; and,
   the aqueous medium has a total salinity of from about 0.1 to about 30 g/L.

7. The method according to claim 1, wherein the aqueous medium is inoculated with the algal culture in an amount to form an aqueous growth medium having an initial optical density of from about 0.3 to about 0.5, as determined using light having a wavelength of about 680 nm.

8. The method according to claim 1, wherein the aqueous medium is inoculated with the algal culture in an amount to form an aqueous growth medium having an initial optical density of from about 0.35 to about 0.45, as determined using light having a wavelength of about 680 nm.

9. The method according to claim 1, wherein the first duration is from about 5 to about 25 days.

10. The method according to claim 1, wherein the collected algal biomass has, based on the dry weight of the biomass, a lipid content of from about 10 to about 35 wt. %.

11. The method according to claim 1, wherein the collected algal biomass has, based on the dry weight of the biomass, a carbohydrate content of from about 20 to about 65 wt. %.

12. The method according to claim 1, wherein the collected algal biomass has, based on the dry weight of the biomass, a protein content of from about 10 to about 30 wt. %.

13. The method according to claim 1, wherein n is from 6 to 8.

14. The method according to claim 1, wherein the first medium of the series has a salinity of from about 0.1 to about 1 g/L.

15. The method according to claim 1, wherein the $n^{th}$ medium of the series has a salinity of from about 32 to about 36 g/L.

16. The method according to claim 1, wherein each of the n media of the series is obtained by admixing oilfield HSB with a second aqueous composition including a source of nitrogen and a source of phosphorous.

17. The method according to claim 16, wherein the second aqueous composition includes synthetic municipal wastewater.

18. The method according to claim 16, wherein the second aqueous composition includes:
- from about 200 to about 500 mg/L of sodium nitrate ($NaNO_3$);
- from about 50 to about 200 mg/L of dipotassium phosphate ($K_2HPO_4$); and,
- from about 100 to about 250 mg/L of $KH_2PO_4$.

19. The method according to claim 1, wherein the duration of subjection of the *Chlorella sorokiniana* UTEX 1230 to each of the n media of the series is independently selected from about 5 to about 25 days.

20. The method according to claim 1, wherein the duration of subjection of the *Chlorella sorokiniana* UTEX 1230 to each of the n media is independently from about 10 to about 25 days.

* * * * *